United States Patent
Liang et al.

(10) Patent No.: US 8,679,674 B2
(45) Date of Patent: Mar. 25, 2014

(54) BATTERY WITH PROTECTIVE PACKAGING

(75) Inventors: Jiuh-Ming Liang, Hacienda Heights, CA (US); Kai-Wei Nieh, Monrovia, CA (US)

(73) Assignee: Front Edge Technology, Inc., Baldwin Park, CA (US)

( * ) Notice: Subject to any disclaimer, the term of this patent is extended or adjusted under 35 U.S.C. 154(b) by 28 days.

(21) Appl. No.: 12/963,610

(22) Filed: Dec. 8, 2010

(65) Prior Publication Data

US 2011/0076550 A1    Mar. 31, 2011

Related U.S. Application Data

(63) Continuation-in-part of application No. 12/783,520, filed on May 19, 2010, now Pat. No. 8,168,322, and a continuation of application No. 11/090,408, filed on Mar. 25, 2005, now Pat. No. 7,846,579.

(51) Int. Cl.
    *H01M 2/02* (2006.01)

(52) U.S. Cl.
    USPC .......... 429/175; 429/185; 429/135; 429/162; 429/167; 429/169; 429/186

(58) Field of Classification Search
    USPC ......... 429/175, 185, 135, 148, 162, 167, 169, 429/177, 186, 246, 247
    See application file for complete search history.

(56) References Cited

U.S. PATENT DOCUMENTS

| | | |
|---|---|---|
| 3,375,135 A | 3/1968 | Moulton et al. |
| 3,414,685 A | 12/1968 | Geib et al. |
| 3,530,007 A | 9/1970 | Golubovic |
| 3,844,841 A | 10/1974 | Baker |
| 3,969,142 A | 7/1976 | Greatbatch et al. |
| 3,993,508 A | 11/1976 | Erlichman |
| 4,031,449 A | 6/1977 | Trombly |
| 4,119,769 A | 10/1978 | Schneider et al. |
| 4,233,371 A | 11/1980 | Dorrestijn |
| 4,309,494 A | 1/1982 | Stockel |
| 4,421,835 A | 12/1983 | Manassen et al. |
| 4,459,328 A | 7/1984 | Mizuhara |
| 4,543,441 A | 9/1985 | Kumada et al. |
| 4,565,753 A | 1/1986 | Goebel et al. |

(Continued)

FOREIGN PATENT DOCUMENTS

| | | |
|---|---|---|
| CN | 1661354 A | 8/2005 |
| EP | 0 829 913 A | 3/1998 |

(Continued)

OTHER PUBLICATIONS

Notice of Allowance dated May 12, 2010 in U.S. Appl. No. 11/090,408, filed Mar. 25, 2005.
Notice of Allowance dated Sep. 21, 2010 in U.S. Appl. No. 11/090,408, filed Mar. 25, 2005.
Notice of Allowance dated Jan. 27, 2010 in U.S. Appl. No. 12/783,520, filed May 19, 2010.
Antaya et al. "Preparation and Characterization of LiCoO2 Thin Films by Laser Ablation Deposition", J. Electrochem. Soc., vol. 140, No. 3, Mar. 1993, pp. 575-578.

(Continued)

*Primary Examiner* — Patrick Ryan
*Assistant Examiner* — Ben Lewis
(74) *Attorney, Agent, or Firm* — Ashok K. Janah; Janah & Associates, P.C.

(57) ABSTRACT

A battery comprises at least one battery cell on a support, the battery cell comprising a plurality of electrodes about an electrolyte, and having a surface. A thermoplastic material covers the surface of the battery cell, the thermoplastic material comprising a nitrogen permeability or oxygen permeability that is less than 20 $cm^3*mm/(m^2*day)$. A cap covers the thermoplastic material.

72 Claims, 8 Drawing Sheets

(56) References Cited

U.S. PATENT DOCUMENTS

| | | | |
|---|---|---|---|
| 4,597,844 A | 7/1986 | Hiraki et al. |
| 4,619,865 A | 10/1986 | Keem et al. |
| 4,663,183 A | 5/1987 | Ovshinsky et al. |
| 4,698,256 A | 10/1987 | Giglia et al. |
| 4,714,660 A | 12/1987 | Gates, Jr. |
| 4,725,345 A | 2/1988 | Sakamoto et al. |
| 4,777,090 A | 10/1988 | Ovshinsky et al. |
| 4,871,433 A | 10/1989 | Wagner et al. |
| 4,873,115 A | 10/1989 | Matsumura et al. |
| 4,877,677 A | 10/1989 | Hirochi et al. |
| 4,882,212 A | 11/1989 | SinghDeo et al. |
| 4,904,542 A | 2/1990 | Mroczkowski |
| 4,996,079 A | 2/1991 | Itoh |
| 5,019,467 A | 5/1991 | Fujiwara |
| 5,171,413 A | 12/1992 | Arntz et al. |
| 5,197,889 A | 3/1993 | Rizzo et al. |
| 5,240,794 A | 8/1993 | Thackeray et al. |
| 5,249,554 A | 10/1993 | Tamor et al. |
| 5,250,891 A | 10/1993 | Glasgow |
| 5,253,300 A | 10/1993 | Knapp |
| 5,254,415 A | 10/1993 | Williams et al. |
| 5,262,028 A | 11/1993 | Manley |
| 5,330,853 A | 7/1994 | Hofmann et al. |
| 5,338,625 A | 8/1994 | Bates et al. |
| 5,368,939 A | 11/1994 | Kawamura et al. |
| 5,445,906 A | 8/1995 | Hobson et al. |
| 5,490,911 A | 2/1996 | Makowiecki et al. |
| 5,498,490 A | 3/1996 | Brodd |
| 5,503,912 A | 4/1996 | Setoyama et al. |
| 5,506,858 A | 4/1996 | Takenaka et al. |
| 5,511,587 A | 4/1996 | Miya et al. |
| 5,512,147 A | 4/1996 | Bates et al. |
| 5,512,387 A | 4/1996 | Ovshinsky |
| 5,516,340 A | 5/1996 | Takeuchi et al. |
| 5,547,767 A | 8/1996 | Paidassi et al. |
| 5,552,242 A | 9/1996 | Ovshinsky et al. |
| 5,554,456 A | 9/1996 | Ovshinsky et al. |
| 5,561,004 A | 10/1996 | Bates et al. |
| 5,597,660 A | 1/1997 | Bates et al. |
| 5,607,789 A | 3/1997 | Treger et al. |
| 5,612,152 A | 3/1997 | Bates |
| 5,629,560 A | 5/1997 | Katsui et al. |
| 5,650,243 A * | 7/1997 | Ferment ............... 429/162 |
| 5,656,364 A | 8/1997 | Rickerby et al. |
| 5,670,252 A | 9/1997 | Makowiecki et al. |
| 5,670,272 A | 9/1997 | Cheu et al. |
| 5,681,666 A | 10/1997 | Treger et al. |
| 5,700,551 A | 12/1997 | Kukino et al. |
| 5,705,293 A | 1/1998 | Hobson |
| 5,705,297 A | 1/1998 | Warren |
| 5,708,297 A | 1/1998 | Clayton |
| 5,725,909 A | 3/1998 | Shaw et al. |
| 5,786,582 A | 7/1998 | Roustaei et al. |
| 5,814,195 A | 9/1998 | Lehan et al. |
| 5,818,199 A | 10/1998 | Beard |
| 5,824,374 A | 10/1998 | Bradley, Jr. et al. |
| 5,871,865 A | 2/1999 | Barker et al. |
| 5,894,656 A | 4/1999 | Menon et al. |
| 5,932,368 A | 8/1999 | Batawi et al. |
| 5,961,672 A | 10/1999 | Skotheim et al. |
| 5,981,102 A | 11/1999 | Grigg et al. |
| 5,985,485 A | 11/1999 | Ovshinsky et al. |
| 6,017,654 A | 1/2000 | Kumta et al. |
| 6,022,640 A | 2/2000 | Takada et al. |
| 6,039,850 A | 3/2000 | Schulz |
| 6,040,680 A | 3/2000 | Toya et al. |
| 6,046,575 A | 4/2000 | Demuro |
| 6,051,114 A | 4/2000 | Yao et al. |
| 6,118,248 A | 9/2000 | Gartstein et al. |
| 6,146,715 A | 11/2000 | Kim et al. |
| 6,148,503 A | 11/2000 | Delnick et al. |
| 6,168,884 B1 | 1/2001 | Neudecker et al. |
| 6,197,450 B1 | 3/2001 | Nathan et al. |
| 6,217,623 B1 | 4/2001 | Reichert et al. |
| 6,218,049 B1 | 4/2001 | Bates et al. |
| 6,220,765 B1 | 4/2001 | Tatoh |
| 6,227,204 B1 | 5/2001 | Baumann et al. |
| 6,238,847 B1 | 5/2001 | Axtell, III et al. |
| 6,242,129 B1 | 6/2001 | Johnson |
| 6,264,709 B1 | 7/2001 | Yoon et al. |
| 6,280,875 B1 | 8/2001 | Kwak et al. |
| 6,287,711 B1 | 9/2001 | Nieh et al. |
| 6,340,880 B1 | 1/2002 | Higashijima et al. |
| 6,365,010 B1 | 4/2002 | Hollars |
| 6,379,835 B1 | 4/2002 | Kucherovsky et al. |
| 6,387,039 B1 | 5/2002 | Moses |
| 6,387,563 B1 | 5/2002 | Bates |
| 6,398,824 B1 | 6/2002 | Johnson |
| 6,402,796 B1 | 6/2002 | Johnson |
| 6,411,780 B1 | 6/2002 | Maruyama |
| 6,413,645 B1 | 7/2002 | Graff et al. |
| 6,461,757 B1 * | 10/2002 | Sasayama et al. ............... 429/59 |
| 6,472,295 B1 | 10/2002 | Morris et al. |
| 6,517,968 B2 | 2/2003 | Johnson |
| 6,558,836 B1 | 5/2003 | Whitacare et al. |
| 6,632,563 B1 | 10/2003 | Krasnov et al. |
| 6,636,017 B2 | 10/2003 | Zink et al. |
| 6,645,658 B2 | 11/2003 | Morozumi |
| 6,658,124 B1 | 12/2003 | Meadows |
| 6,661,197 B2 | 12/2003 | Zink et al. |
| 6,696,199 B2 | 2/2004 | Yoshida et al. |
| 6,700,766 B2 | 3/2004 | Sato |
| 6,713,987 B2 | 3/2004 | Krasnov et al. |
| 6,805,998 B2 | 10/2004 | Jenson et al. |
| 6,863,699 B1 | 3/2005 | Krasnov et al. |
| 6,866,901 B2 | 3/2005 | Burrows et al. |
| 6,916,679 B2 | 7/2005 | Snyder et al. |
| 6,921,464 B2 | 7/2005 | Krasnov et al. |
| 6,940,988 B1 | 9/2005 | Shennib et al. |
| 6,982,132 B1 | 1/2006 | Goldner et al. |
| 7,037,621 B2 | 5/2006 | Kikuchi et al. |
| 7,056,620 B2 | 6/2006 | Krasnov et al. |
| 7,122,908 B2 | 10/2006 | Jiang et al. |
| 7,157,187 B2 | 1/2007 | Jenson |
| 7,186,479 B2 | 3/2007 | Krasnov et al. |
| 7,194,801 B2 | 3/2007 | Jenson et al. |
| 7,194,901 B2 | 3/2007 | Silverbrook et al. |
| 7,276,878 B2 | 10/2007 | Phillips et al. |
| 7,286,479 B2 | 10/2007 | Bragg |
| 7,308,316 B2 | 12/2007 | Schommer |
| 7,359,590 B2 | 4/2008 | Hsu |
| 7,397,118 B2 | 7/2008 | Tominaga |
| 7,510,582 B2 | 3/2009 | Krasnov et al. |
| 7,524,577 B2 | 4/2009 | Bates |
| 7,701,176 B2 | 4/2010 | Chen |
| 7,846,579 B2 | 12/2010 | Krasnov et al. |
| 7,862,627 B2 | 1/2011 | Li et al. |
| 7,862,927 B2 | 1/2011 | Krasnov et al. |
| 8,030,898 B2 | 10/2011 | Okuto |
| 8,168,322 B2 | 5/2012 | Krasnov et al. |
| 2001/0007335 A1 | 7/2001 | Tuttle et al. |
| 2001/0041294 A1 | 11/2001 | Chu et al. |
| 2001/0052645 A1 | 12/2001 | Op'T Eynde et al. |
| 2002/0004167 A1 | 1/2002 | Jenson et al. |
| 2002/0028384 A1 | 3/2002 | Krasnov et al. |
| 2002/0041930 A1 | 4/2002 | Erdemir et al. |
| 2002/0071989 A1 * | 6/2002 | Verma et al. ............... 429/176 |
| 2002/0100989 A1 | 8/2002 | Jiang et al. |
| 2002/0102400 A1 | 8/2002 | Gorokhovsky et al. |
| 2002/0110733 A1 | 8/2002 | Johnson |
| 2002/0150823 A1 | 10/2002 | Breitkopf et al. |
| 2003/0121142 A1 | 7/2003 | Kikuchi et al. |
| 2003/0143460 A1 | 7/2003 | Yoshida et al. |
| 2003/0152829 A1 | 8/2003 | Zhang et al. |
| 2003/0160589 A1 | 8/2003 | Krasnov et al. |
| 2004/0018424 A1 | 1/2004 | Zhang et al. |
| 2004/0064937 A1 | 4/2004 | Krasnov et al. |
| 2004/0086762 A1 | 5/2004 | Maeda et al. |
| 2004/0175609 A1 | 9/2004 | Yageta et al. |
| 2005/0079418 A1 | 4/2005 | Kelley et al. |
| 2005/0112461 A1 | 5/2005 | Amine et al. |
| 2005/0130032 A1 | 6/2005 | Krasnov et al. |
| 2005/0147877 A1 * | 7/2005 | Tarnowski et al. ............... 429/162 |
| 2005/0156573 A1 | 7/2005 | Lin |

(56) References Cited

U.S. PATENT DOCUMENTS

| | | |
|---|---|---|
| 2005/0275370 A1 | 12/2005 | Kim |
| 2006/0027937 A1 | 2/2006 | Benson et al. |
| 2006/0040169 A1 | 2/2006 | Liu et al. |
| 2006/0040170 A1 | 2/2006 | Liu et al. |
| 2006/0060956 A1 | 3/2006 | Tanikella |
| 2006/0068258 A1 | 3/2006 | Kinoshita |
| 2006/0115706 A1 | 6/2006 | Maeda et al. |
| 2006/0134522 A1 | 6/2006 | Zhang et al. |
| 2006/0152196 A1 | 7/2006 | Matsumoto et al. |
| 2006/0216589 A1 | 9/2006 | Krasnov et al. |
| 2006/0226812 A1 | 10/2006 | Patino et al. |
| 2006/0267546 A1 | 11/2006 | Shen et al. |
| 2007/0000688 A1 | 1/2007 | Mobley |
| 2007/0037054 A1 | 2/2007 | Kikuchi et al. |
| 2007/0047750 A1 | 3/2007 | Sauer et al. |
| 2007/0104343 A1 | 5/2007 | Bengtsson et al. |
| 2007/0104344 A1 | 5/2007 | Goldberg |
| 2007/0141460 A1 | 6/2007 | You et al. |
| 2007/0166612 A1 | 7/2007 | Krasnov et al. |
| 2007/0172739 A1 | 7/2007 | Visco et al. |
| 2007/0200258 A1 | 8/2007 | Mahler et al. |
| 2007/0297108 A1 | 12/2007 | Collins et al. |
| 2008/0003492 A1 | 1/2008 | Bates |
| 2008/0087986 A1 | 4/2008 | Tanikella |
| 2008/0191342 A1 | 8/2008 | Otremba |
| 2008/0213664 A1 | 9/2008 | Krasnov et al. |
| 2008/0217162 A1 | 9/2008 | Delrue et al. |
| 2008/0263855 A1 | 10/2008 | Li et al. |
| 2008/0290363 A1 | 11/2008 | Lin et al. |
| 2008/0303056 A1 | 12/2008 | Ward et al. |
| 2008/0308935 A1 | 12/2008 | Kim et al. |
| 2009/0010462 A1 | 1/2009 | Ekchian et al. |
| 2009/0029500 A1 | 1/2009 | Wan |
| 2009/0039498 A1 | 2/2009 | Bayerer |
| 2009/0057136 A1 | 3/2009 | Wang et al. |
| 2009/0114429 A1 | 5/2009 | Sri-Jayantha et al. |
| 2009/0115051 A1 | 5/2009 | Leung et al. |
| 2009/0136839 A1 | 5/2009 | Kraznov et al. |
| 2009/0208671 A1* | 8/2009 | Nieh et al. ............ 427/596 |
| 2010/0247987 A1 | 9/2010 | Holung et al. |
| 2010/0291431 A1 | 11/2010 | Shih et al. |
| 2011/0050159 A1 | 3/2011 | Nieh et al. |
| 2011/0076550 A1 | 3/2011 | Liang et al. |
| 2011/0094094 A1 | 4/2011 | Li et al. |
| 2011/0273809 A1 | 11/2011 | Falsett et al. |
| 2012/0003520 A1 | 1/2012 | Lee et al. |
| 2012/0034502 A1 | 2/2012 | Nieh et al. |
| 2012/0080940 A1 | 4/2012 | Larsen |
| 2012/0251867 A1 | 10/2012 | Krasnov et al. |
| 2012/0268057 A1 | 10/2012 | Wu |

FOREIGN PATENT DOCUMENTS

| | | |
|---|---|---|
| EP | 1 353 429 A | 10/2003 |
| EP | 1 458 037 A | 9/2004 |
| FR | 2 403 652 A | 4/1979 |
| GB | 2251119 A | 6/1992 |
| JP | 59-032023 A | 2/1984 |
| JP | 59-226472 A | 12/1984 |
| JP | 60-072168 | 4/1985 |
| JP | 61195563 A | 8/1986 |
| JP | 04-295015 | 10/1992 |
| JP | 09-259929 A | 10/1997 |
| JP | 2001-044073 A | 2/2001 |
| JP | 2002-165358 | 6/2002 |
| JP | 2002-313289 | 10/2002 |
| JP | 2003-249199 A | 9/2003 |
| WO | WO-95/14311 A | 5/1995 |
| WO | WO-98/08672 A1 | 3/1998 |
| WO | WO-99/23714 | 5/1999 |
| WO | WO-99/52589 A1 | 10/1999 |
| WO | WO-00/60689 A | 10/2000 |
| WO | WO-01/73873 A | 10/2001 |
| WO | WO-02/061828 A2 | 8/2002 |
| WO | WO-02/021627 A3 | 1/2003 |
| WO | WO-02/042516 A3 | 1/2003 |
| WO | WO-03/061049 A | 7/2003 |
| WO | WO-03/073531 A3 | 12/2003 |
| WO | WO-03/005477 A3 | 12/2004 |
| WO | WO-2004/111659 A2 | 12/2004 |
| WO | WO-2006/042357 A1 | 4/2006 |
| WO | WO-2006/105188 A1 | 10/2006 |
| WO | WO-2006/105050 A3 | 3/2007 |
| WO | WO-2007/042394 | 4/2007 |
| WO | WO-2008/004851 A1 | 1/2008 |
| WO | WO-2008/108999 A3 | 11/2008 |
| WO | WO-2008/134053 A1 | 11/2008 |
| WO | WO-2009/052683 A1 | 4/2009 |
| WO | WO-2009/073150 | 6/2009 |

OTHER PUBLICATIONS

Fragnaud et al. "Characterization of sprayed and sputter deposited LiCoO2 thin films for rechargeable microbatteries", J. Power Sources, 63 (1996), pp. 187-191.

Birke et al. "Materials for lithium thin-film batteries for application in silicon technology", Solid State Ionics, 93 (1997), pp. 1-15.

Benqlilou-Moudden et al. "Amorphous Lithium Cobalt and Nickel Oxides Thin Films Preparation and Characterization by RBS and PIGE", Thin Solid Films 333 (1998), pp. 16-19.

Mattox, Donald M., Handbook of Physical Vapor Deposition (PVD) Processing, Film Formation, Adhesion, Surface Preparation and Contamination Control, 1998, pp. 127-135 and 343-364, Noyes Publications, Westwood, New Jersey, USA.

Non-Final Office Action dated Aug. 30, 2012 in U.S. Appl. No. 13/461,753, filed May 1, 2012.

PCT International Search Report in Application No. PCT/US2008/013213 (WO 2009/073150 A1), mailed Jun. 18, 2009.

Roh et al., "Effects of deposition condition on the ionic conductivity . . . " Scripta Materialia, Dec. 17, 1999, pp. 43-49, vol. 42. No. 1, New York, NY.

Bolster et al., "Investigation of lithium intercalation metal oxides for thermalbatteries" Proceedings of the 34th Int'l Power Source Symposium, Jun. 25-28, 1990, pp. 136-140.

Yang et al., "Effect of annealing temperature on structure and electrochemical properties of LiCoO2 cathode thin films", Rare Metals, vol. 25, Dec. 2006, pp. 189-192.

Liang, Jiuh-Ming, U.S. Appl. No. 13/434,775, filed Mar. 29, 2012, for Localized Heat Treatment of Battery Component Films.

Nieh et al., U.S. Appl. No. 13/627,977, filed Sep. 26, 2012, for Plasma Deposition on a Partially Formed Battery Through a Mesh Screen.

Shih et al., U.S. Appl. No. 13/626,842, filed Sep. 25, 2012, for Solid State Battery Having Mismatched Cells.

Shih et al., U.S. Appl. No. 13/333,969, filed Dec. 21, 2011, for Laminated Lithium Battery.

Nieh et al., U.S. Appl. No. 13/337,031, filed Dec. 23, 2011, for Sputtering Lithium-Containing Material With Multiple Targets.

Shih et al., U.S. Appl. No. 13/652,416, filed Oct. 15, 2012, for Lithium Battery Having Low Leakage Anode.

Liang et al., U.S. Appl. No. 13/278,082, filed Oct. 20, 2011, for Thin Film Battery Packaging Formed by Localized Heating.

PCT International Search Report in Application No. PCT/US2011/046674 dated Feb. 17, 2012.

Bates et al., "Preferred orientation of polycrystalline LiCoO2 films" J. of the Electrochemical Society (2000), pp. 59-70, Issue No. 147 (1).

Wagner et al., "Fabrication and Testing of thermoelectric thin film devices" 15th Int'l Conf. on Thermoelectrics, Mar. 26-29, 1996, pp. 269-273.

Neudecker et al., "Lithium-Free Thin-Film Battery . . . " Journal of the Electrochemical Society (2000), pp. 517-523, Issue No. 147 (2).

Park et al., "Characterization of tin oxide/LiMn2O4 thin-film cell," Journal of Power Sources, Jun. 2000, pp. 250-254, vol. 88, No. 2, Elsevier Science S.A.

PCT International Preliminary Report on Patentability, Application No. PCT/US2008/013213 (WO09/073150), Mailed Jun. 10, 2010.

\* cited by examiner

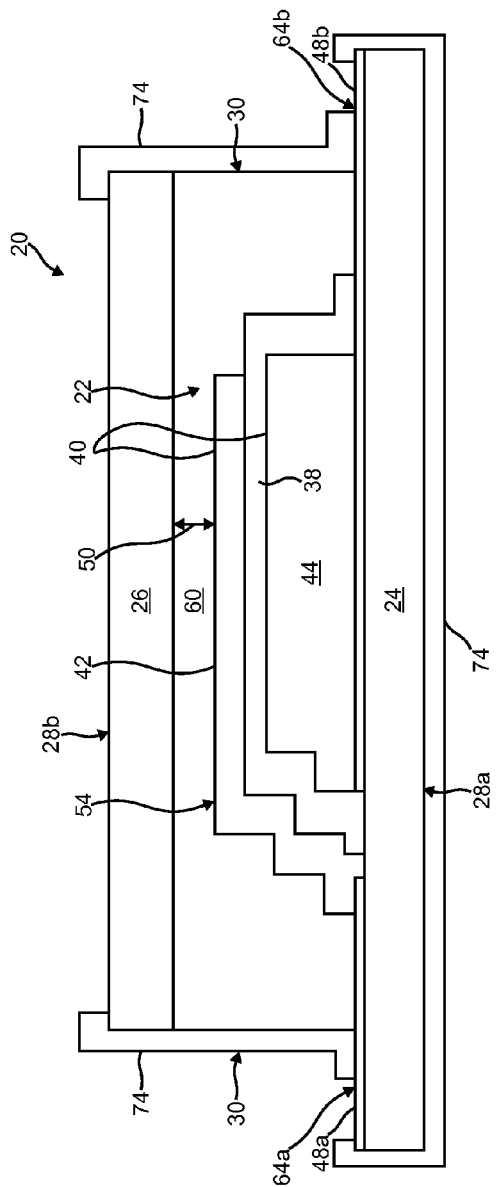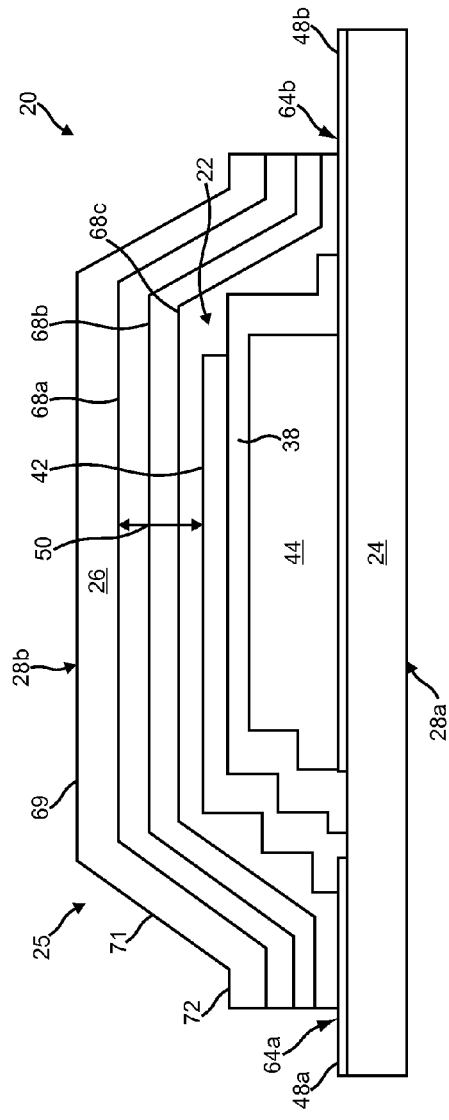

BATTERY WITH PROTECTIVE PACKAGING

CROSS REFERENCE

The present application is a continuation-in-part of U.S. patent application Ser. No. 12/783,520, filed on May 19, 2010, which is a continuation of U.S. application Ser. No. 11/090,408, filed on Mar. 25, 2005 (issued under U.S. Pat. No. 7,846,579), both of which are incorporated by reference herein and in their entireties.

BACKGROUND

Embodiments of the present invention relate to solid state batteries, and especially to thin film batteries, and their fabrication.

Solid state batteries, which are batteries that are absent liquid and in the solid state, such as for example, thin film batteries, are being rapidly developed for many applications. The energy density and specific energy of a battery, which expresses the energy capacity of the battery per unit volume and weight, respectively, are important performance measures. Generally, solid state and thin film batteries provide higher energy density and specific energy than liquid containing batteries. In small sizes, solid state batteries are often fabricated by microelectronic processing techniques, and used in applications such as for example, portable electronics, medical devices, and space systems. In larger sizes, the batteries can be used to power electric cars or store electrical power in a home or electrical grid.

A solid state battery can have a one or more battery cells connected in series or parallel within the battery. Each battery cell comprises battery components such as electrodes like the anode, cathode, anode current collector, cathode current collector, and an electrolyte between the electrodes. However, the solid state battery components are often sensitive to exposure to the surrounding external environment, for example air, oxygen, carbon monoxide, carbon dioxide, nitrogen, moisture and organic solvents. Thus, protective packaging for a battery or a battery cell within the battery is used to reduce or eliminate exposure of the thin films to the external environment. For example, a protective sheet of polymer can be laminated onto the battery structure to serve as protective packaging. However, such conventional packaging structures are often thicker than the original battery. For example, in thin film batteries, the laminated sheets typically have to be tens or hundreds of micrometers thick to provide adequate protection and structural support, whereas the battery component themselves are only a few micrometers thick. Thus, the laminated packaging substantially increases the weight and volume of the thin film battery, and consequently, reduces its energy density and specific energy.

A protective covering film deposited onto the battery structure can also serve as protective packaging. Such protective films can include ceramics, metals, and polymer materials. However, such films often do not provide protection from the elements for a long time, and eventually allow gases or other atmospheric elements to leach through the defects in the films in a few months. The covering films also do not provide adequate structural support, and their use may entail additional packaging to increase the structural strength of the battery, which further reduces the battery energy density. Furthermore, these films often have to also be several tens of micrometers thick to provide adequate environmental protection, and this additional thickness still further limits energy density.

A sheet of glass can also be positioned over the battery component films to serve as protective packaging. However, the glass sheet presents an inflexible boundary to the underlying battery component films. For example, the anode typically expands and contracts during the charge and discharge cycles of the battery. The inflexible glass sheet restricts such expansion creating mechanical stresses in the anode which may eventually lead to mechanical or chemical failure and reduce the lifetime or degrade the performance of the battery. The glass sheet is also typically thick and weighty, thus further reducing the energy density and specific energy of the battery.

For reasons including these and other deficiencies, and despite the development of various protective packaging structures for solid state and thin film batteries, further improvements in protective thin battery packaging and methods of fabrication are continuously being sought.

SUMMARY

A battery comprises at least one battery cell on a support, the battery cell comprising a plurality of electrodes about an electrolyte, and having a surface. A thermoplastic material covers the surface of the battery cell, the thermoplastic material comprising a nitrogen permeability or oxygen permeability that is less than 20 $cm^3*mm/(m^2*day)$. A cap covers the thermoplastic material.

A battery fabrication process comprises fabricating at least one battery cell on a support, the battery cell comprising a plurality of electrodes about an electrolyte. A thermoplastic material is selected, the thermoplastic material comprising a nitrogen permeability or oxygen permeability that is less than 20 $cm^3*mm/(m^2*day)$. A protective package is formed around the battery cell by laminating the battery cell to the thermoplastic material and a cap.

A battery comprises at least one battery cell on a support, the battery cell comprising a plurality of electrodes about an electrolyte, and having a surface. A first polymer layer and a second polymer layer cover the surface of the battery cell. A cap covers the first and second polymer layers.

A battery fabrication process comprises fabricating at least one battery cell on a support, the battery cell comprising a plurality of electrodes about an electrolyte. A plurality of polymer layers are laminated to a cap to form a laminated polymer cap. The laminated polymer cap is laminated to the battery cell.

A battery fabrication process comprises fabricating at least one battery cell on a support, the battery cell comprising a plurality of electrodes about an electrolyte. A plurality of polymer layers are laminated to the battery cell to form a polymer laminated battery cell. A cap is laminated to the polymer laminated battery cell.

A battery comprises at least one battery cell on a support, the battery cell comprising a plurality of electrodes about an electrolyte. A thermoset material covers the surface of the battery cell, the thermoset material having a water permeability of less than 4 $g*mm/(m^2*day)$, a nitrogen permeability of less than 20 $cm^3*mm/(m^2*day)$, an oxygen permeability of less than 20 $cm^3*mm/(m^2*day)$, and an elastic modulus of less than 2 GPa. A cap covers the surface of the thermoset material.

A battery comprises a substrate comprising a first surface comprising a first battery cell having a first non-contact surface with a central portion and a peripheral portion. A first polymer covers the central portion of the non-contact surface, and a second polymer covers the peripheral portion of the non-contact surface, the second polymer being a different polymer than the first polymer. A cap covers the exposed surface of the first and second polymers.

DRAWINGS

These features, aspects and advantages of the present invention will become better understood with regard to the following description, appended claims, and accompanying drawings, which illustrate examples of the invention. However, it is to be understood that each of the features can be used in the invention in general, not merely in the context of the particular drawings, and the invention includes any combination of these features, where:

FIG. 3 is a sectional view of the battery of FIG. 1 with a cover layer covering the exterior surface of the substrate;

FIG. 4 is a sectional view of a battery comprising a single battery cell on a substrate with multiple first and second polymer layers filling the separation gap between the battery cell and a facing cap;

Figure 14:
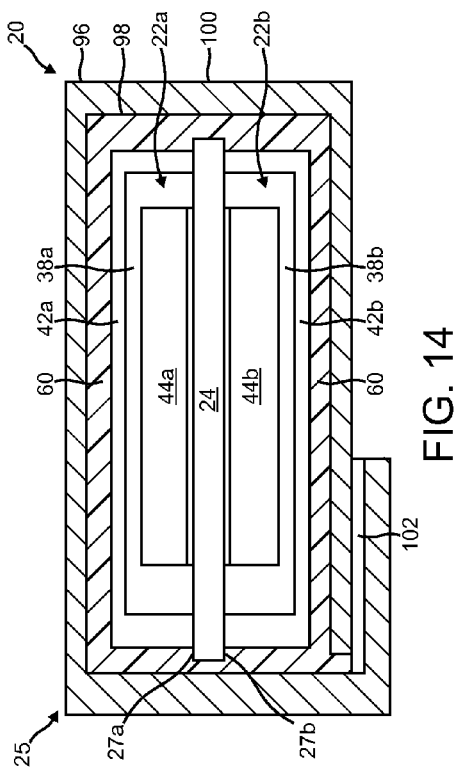
Figure 15:
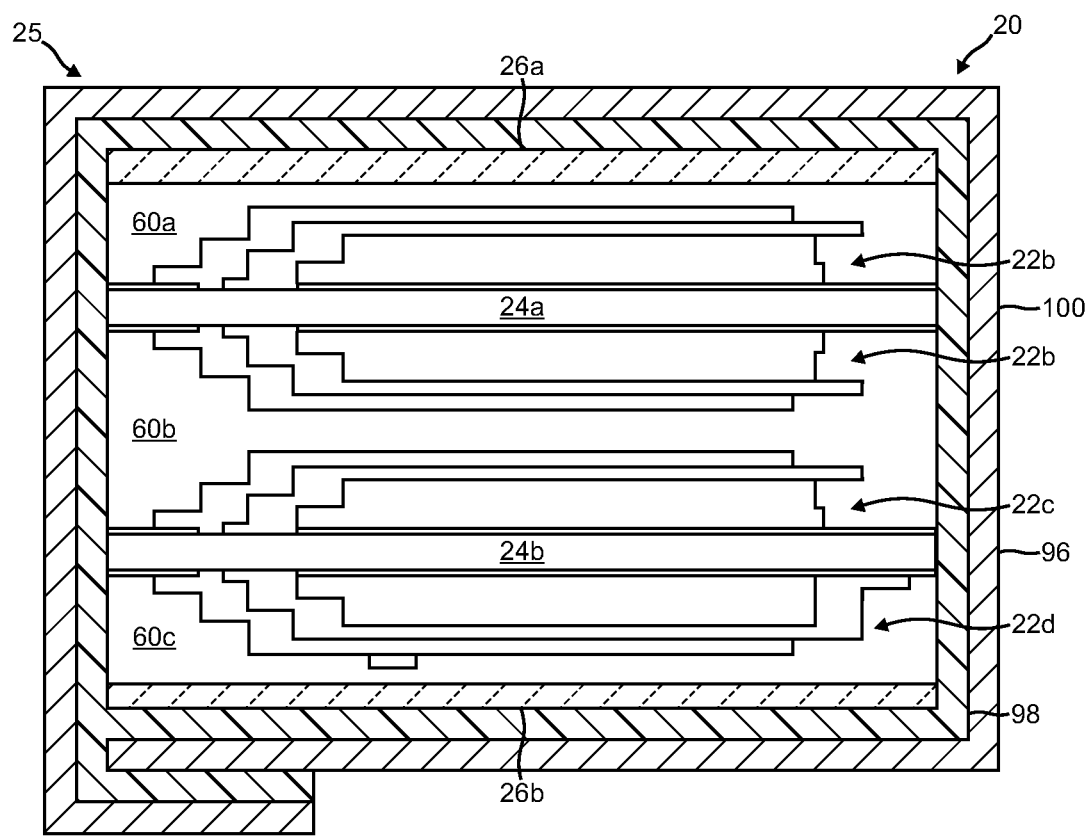

FIG. 14 is a sectional view of a battery comprising dual battery cells formed on opposing surfaces of a single substrate, and having an edge seal wrapped around the entire battery with overlapping ends; and FIG. 15 is a sectional view of a battery comprising a stack of substrates that each have dual battery cells on either side, with two caps and elastic and sealing layers therebetween, and having an edge seal wrapped around the entire battery.

DESCRIPTION

Figure 1:
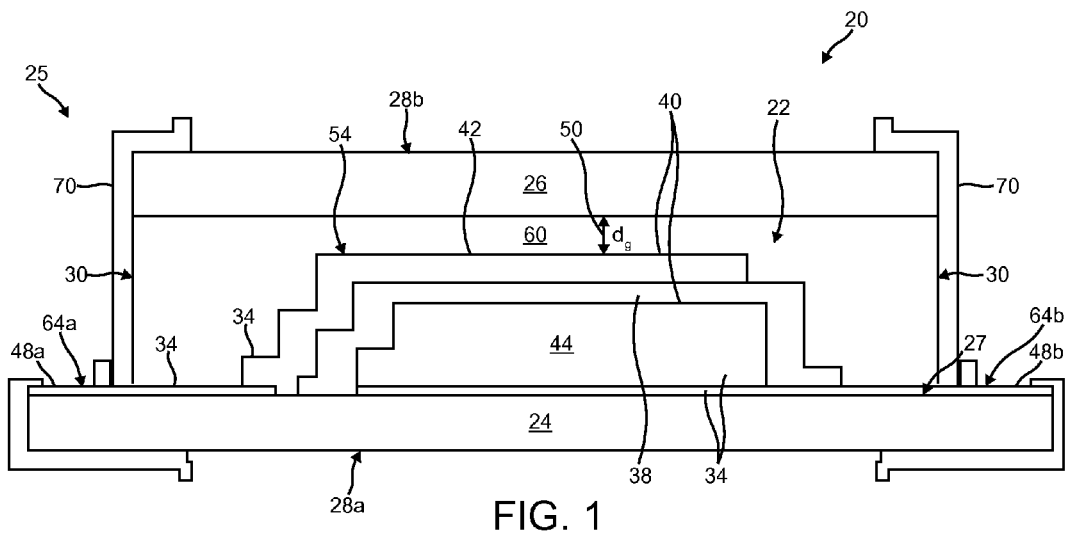
FIG. 1 is a sectional view of a battery comprising a single battery cell on a substrate with a polymer layer filling the separation gap between the battery cell and a facing cap, and an optional edge seal around the side faces of the battery.

An embodiment of a battery 20 having features of the present invention is illustrated in FIG. 1. In the version shown, the battery 20 comprises a single battery cell 22 enclosed on one side by the substrate 24 and on the other side by a cap 26 facing the substrate 24 to form a protective package 25. The protective package 25 forms an enclosure comprising the substrate 24 and cap 26 protect the battery component films of the battery cell 22 from the external environment.

The substrate 24 serves as a support for the battery cell 22 and is made from a material that is suitably impermeable to environmental elements, has a relatively smooth processing surface 27 upon which to form thin films, and also has sufficient mechanical strength to support the deposited thin films at fabrication temperatures and at battery operational temperatures. The substrate 24 can be an insulator, semiconductor, or a conductor, depending upon the desired electrical properties of the exterior surface 28a. For example, the substrate 24 can also be made from a ceramic, metal or glass, such as for example, aluminum oxide, silicate glass, or even aluminum or steel, depending on the application. In one version, the substrate 24 comprises mica, which is a layered silicate typically having a muscovite structure, and a stoichiometry of $KAl_3Si_3O_{10}(OH)_2$. Mica has a six-sided planar monoclinic crystalline structure with good cleavage properties along the direction of the large planar surfaces. Because of this crystal structure, mica may be split into thin foils along its basal lateral cleavage planes to provide thin substrates 24 having surfaces which are smoother than most chemically or mechanically polished surfaces. Chemically, mica is stable and inert to the action of most acids, water, alkalis, and common solvents, making it a good surface covering for the battery. Electrically, mica has good dielectric strength, uniform dielectric constant, and low electrical power loss factor. Mica is also stable at high temperatures of up to 600° C. and has good tensile strength. A mica substrate 24 having a thickness of less than 100 microns, or even 50 microns, and more typically from about 10 to about 25 microns, is sufficiently strong to provide a good mechanical support for the battery 20. Such a thickness for the substrate 24 also provides a good barrier to external gases and liquids in the direction normal to the cleavage plane, and thus, is capable of providing good environmental protection in many different environments. Mica also has a relatively low weight and volume, thus improving the specific energy and energy density of the battery 20.

At the other side of the battery cell 22, facing the substrate 24 is a cap 26 that serves as a portion of the protective package 25. The cap 26 is typically made from a material that is resistant to environmental degradation and provides an impenetrable seal from external gases and liquids. The cap 26 can also comprise the same material as the substrate 24, such as a sheet of mica, in which case both of the wide or large area surfaces of the battery 20 are enclosed by mica sheets. Either the substrate 24 or the cap 26 can also be made from other materials, including quartz, metal foil, polymer foil, metal foil coated with an electrically insulating polymer, or metalized polymer film. ceramic plate, or a polymer plate. For example, the metal foil can be aluminum foil. The electrically insulating polymer coating over a metal foil can be, for example, parylene or epoxy. The substrate 24 and cap 26 can also be made from different materials, for example, a substrate 24 of mica and a cap 26 of metal foil or metal foil coated with a polymer.

One advantage of using a cap 26 comprising a metal foil is that it allows the battery 20 to dissipate heat more effectively. For example, the battery can start heating up when there is a local electrical short. Such localized electrical shorts can be caused by a defect in the electrolyte. Another cause for local shorts occurs when a sharp object penetrates the protective package 25 and touches the battery component films. The batteries 20 can also heat up during the charging or sometimes discharging cycles. The local heating can damage the battery 20 or adjacent structures. A cap made of a metal foil serves to more rapidly dissipate heat, by acting as a heat sink, thereby preventing the battery temperature from rising excessively.

The substrate 24 and facing cap 26 form a large portion of the external enclosing structure of the protective package 25 that protects the internal battery cell 22 from exposure and corrosion by the surrounding environment. For example, in one type of battery, the external surface 28a of the substrate 24 and the external surface 28b of the cap 26 each measure at least about 30% (for a total of about 60%) of the total external area of the package 25. The remaining less than 20%, or even less than 10%, of the external area of the package 25 is along a plurality of side faces 30 that are the spaces between the cap 26 and substrate 24. In one version, the battery 20 is fabricated so that at least one substrate 24 on which a battery cell 22 is formed, also forming a large percentage of the area of the package 25 that is exposed to the surrounding environment. Thus, in the battery shown in FIG. 1, about 45% of the external surface area of the package 25 is formed by the backside surface 28a of the substrate 24, and the surface 28b of the cap 26 forms about another 45%, with the remaining 10% being formed by the side faces 30. In the alternative, when the substrate 24 and cap 26 are made from the same material, for example, two sheets of mica, about 90% of the external surface area of the package 25 arises from the surfaces 28a,b. By using the substrate 24 itself to serve as the supportive structure for the battery 20 as well as the enclosing environment, the weight and volume of the enclosing structure is minimized, thereby increasing the energy density of the battery.

Each battery cell 22 of the battery 20 comprises a plurality of conductors 34 that are on opposing surfaces of an electrolyte 38. The conductors 34 are made from conducting materials and can serve as electrodes 40 such as the anode 42 and cathode 44, anode and cathode current collectors 48a,b, adhesion film, or combinations thereof. In some versions, an anode current collector 48a is not used because the anode 42 serves both as the anode current collector and the anode itself. Thus, the claims should not be limited to the illustrative version described and shown herein. In the version shown in FIG. 1, when used, the anode current collector 48a and the cathode current collector 48b are both formed on the surface of the substrate 24 with an adhesion film (not shown) between the cathode current collector 48b and the substrate 24, and the other layers are deposited over these layers.

The electrolyte 38 lies between the pair of conductors 34 such as the anode 42 and the cathode 44. In one version, the electrolyte 38 may be, for example, an amorphous lithium phosphorus oxynitride film, also known as a LiPON film. In one embodiment, the LiPON is of the form $Li_xPO_yN_z$, for example, in an x:y:z ratio of about 2.9:3.3:0.46. In one version, the electrolyte 38 has a thickness of from about 0.1 microns to about 5 microns. This thickness is suitably large to provide sufficient protection from shorting of the two electrodes 42, 44, and suitably small to reduce ionic pathways to minimize electrical resistance and reduce stress.

The anode 42 and cathode 44, each comprise an electrochemically active material, such as, for example, amorphous vanadium pentoxide $V_2O_5$, or one of several crystalline compounds such as $TiS_2$, $LiMnO_2$, $LiMn_2O_2$, $LiMn_2O_4$, $LiCoO_2$ and $LiNiO_2$. In one version, the anode 42 is made from lithium and the cathode 44 is made from $LiCoO_2$. A suitable thickness for the anode 42 or cathode 44 is from about 0.1 microns to about 50 microns.

The anode and cathode current collectors 48a,b, respectively, provide a conducting surface from which electrons may be dissipated or collected from the electrodes 40. The current collectors 48a,b are shaped and sized to increase electron conductivity to or from the electrodes 40, and are formed over or below the electrodes 40, to electrically couple to the same. The current collectors 48a,b are typically conductive layers comprising metal-containing materials, such as for example, metal, non-reactive metal, metal alloy, metal silicide, conductive metal oxides, or mixtures thereof. For example, in one version, each of the current collectors 48a,b comprises a non-reactive metal such as silver, gold, platinum or aluminum. The advantage to using a non-reactive metal is that the battery 20 may be processed at relatively high temperatures after forming the current collectors 48a,b without the current collector material reacting with other component films of the battery 20. However, in other versions, the current collectors 48a,b need not be a non-reactive metal. The current collectors 48a,b have a thickness selected to provide a suitable electrical conductivity, for example, in one version, the current collectors 48a,b have thicknesses of from about 0.05 microns to about 5 microns. In one version, the anode current collector 48a is made from copper and the cathode current collector 48a is made from platinum.

The battery 20 may also comprise one or more adhesion layers (not shown) deposited on the interior surface 27 of the substrate 24 or the surfaces of any of the other layers, to improve adhesion of overlying layers. The adhesion layer can comprise a metal such as, for example, titanium, cobalt, aluminum, other metals; or a ceramic material such as, for example, $LiCoO_x$, which may comprise a stoichiometry of $LiCoO_2$.

In the version shown in FIG. 1, the battery 20 has a separation gap 50 between a non-contact surface 54 of a conductor 34, such as a surface of an electrode 40, for example the anode 42 which is formed on the substrate 24 and the cap 26 of the protective package 25. The separation gap 50 provides room for the components of the battery cell 22 to expand, contract and move during operation of the battery 20. For example, the battery cell 22 may generate or receive heat during operation which may cause conductors 34, such the electrodes 40, current collectors 48a,b or other battery components, to undergo thermal expansion. The electrodes 40 or the electrolyte 38, or both, may also experience expansion or contraction of their volume due to the removal or addition of material to these layers through electrochemical processes occurring during operation of the battery 20. Without the separation gap 50, components of the battery 20 would have no room to expand and may experience undesirable mechanical stresses, which could lead to reduced performance or failure of the battery 20. For example, undesirable mechanical stresses may result in a physical failure, such as a breakage or delamination, of a battery component. This may cause a discontinuity in an electrical path of the battery 20 or a parasitic electrical resistance that may reduce performance of the battery 20, such as reducing the output voltage or power storage capacity. Thermal expansion of the battery components can also cause the components to break or delaminate leading to electrical shorting or even battery self-discharge.

The separation gap 50 has a gap distance $d_g$ that is selected to be sufficiently large to provide room for the thermal expansion or other forms of expansion of the battery components. The gap distance $d_g$ is selected to be sufficiently small to avoid excessively impacting the energy density of the battery 20. For example, in one version, the gap distance $d_g$ is selected to be less than 120 microns, or even less than 30 microns, or example, from about 10 microns to about 30 microns. The gap 50 is bounded by the non-contact surface 54, which is on at least one of the conductors 34 and the side faces 30 which are originally open side facing regions around the perimeter edge of the gap 50 and which are not enclosed by the substrate 24 or cap 26. The total area of the side faces 30 is maintained small by maintaining a small gap distance $d_g$ to reduce the diffusion or passage of gas species that enter the battery 20 from the side faces 30 and travel to the conductors 34 or other battery components of the battery 20 and cause reaction or other degradation of the thin films. The separation gap 50 presents a location where the components of the battery cell 22 might be exposed to undesirable atmospheric elements if otherwise unprotected. A narrow gap 50 defines a narrow passage that limits migration of gas or other contaminant species from the external environment to the conductors 34.

In one version, as shown, a portion or all of area of the separation gap 50 above the non-contact surface 54 of the battery cell 22 and the cap 26 is filled with a polymer layer 60. In addition, the polymer layer 60 is desirably an electrical insulator, as it is likely to come in contact with a conductor 34 such as the anode 42 or cathode 44. In one version, the resistance of the polymer layer 60 should be sufficiently high that the leakage current through the polymer layer 60 under a battery voltage of about 4V is less than 10 nA, or even less than 1 nA. In one example, if the capacity of the battery 20 is 1 mAh and the required self-discharge of the battery 20 is no more than 1% per year; then the current through the polymer layer 60 at about 4V should be no more than about 1.1 nA. Therefore the resistance of the polymer layer 60 across the anode 42 and cathode 44 should be at least about 3600 MΩ. The polymer layer 60 should also be nonreactive with the battery components of the battery 20 across the intended battery operation temperature range. For example, when the battery 20 comprises a battery component made of lithium, such as the anode 42, the polymer layer 60 should have minimal reaction with the lithium anode. A reaction between the polymer layer 60 and the lithium current collector can cause an increase in internal resistance. The reaction product can also cause delamination and/or high interfacial stress which can lead to poor cycle behavior.

In one version, the polymer layer 60 is made from a polymer material having good sealing properties to protect the sensitive battery components from the external environment. For example, in one aspect, the polymer material of the polymer layer 60 is selected to provide a good moisture barrier, and have a sufficiently low water permeability rate to allow the battery cell 22 to survive in humid external environments. The water permeability rate affects the rate at which water vapor can diffuse through the polymer molecules. The battery cell 22 should have a sufficiently low water permeability rate to survive at relative humidity levels of higher than 90%. To do this, the polymer layer 60 should be made of a polymer having a water permeability of less than $g*mm/(m^2*day)$ (10 $g*mil/(100\ inch^2*day)$).

In another version, or in addition, the polymer layer 60 can also provide a good barrier to the transmittance of gases, such as for example, oxygen, nitrogen, carbon monoxide or carbon dioxide. The diffusion of gases through the polymer material can cause degradation of the battery components. For example, oxygen can cause oxidation of lithium to provide lithium oxide which results in lower capacity and higher internal resistance. Nitrogen can cause nitridation of lithium to provide lithium nitride which can also result in a decrease in capacity and increase in internal resistance. As another example, carbon monoxide or carbon dioxide can react with lithium to form lithium carbide which also results in a reduction of capacity and an increase in internal resistance. Through experimentation is has been determined that the polymer layer should have an oxygen and nitrogen permeability of less than 80 $cm^3*mm/(m^2*day)$ (200 $cm^3*mil/(100\ inch^2*day)$).

The width, thickness, and permeability of the polymer layer 60 should be selected to provide sufficient protection from permeation by the elements. The lower the permeability of the polymer layer 60, the smaller the needed width of the polymer layer 60. Also, a thinner the polymer layer 60 can increase the energy density of the battery 20. A smaller sealing width increases the energy density of the battery 20 but also allows more gases to permeate through the polymer layer 60 and causes more degradation of the cell performance.

In addition, the polymer layer 60 can be selected to have a sufficiently low elastic modulus to allow the underlying battery components of the battery cell, such as for example, an electrode such as the anode 42 to expand during a charging cycle of the battery 20 and thereafter, contract during a discharge cycle of the battery 20. The electrodes 40, electrolyte 38, or both, can expand or contract from the removal or addition of material during operation of the battery 20. The polymer layer 60 has a sufficiently low elastic modulus to allow the components of the battery 20 to expand without undesirable mechanical stresses. Through experimentation it has been determined that the polymer layer 60 should have an elastic modulus of less than 2 GPa, or even less than 1 GPa, or even from about 0.05 GPa to about 1 GPa, or even from about 0.1 GPa to about 0.5 GPa.

In one version, the polymer layer 60 is composed of a thermoset or thermoplastic polymer. In one version, the thermoset polymer undergoes a chemical change during processing to become "set" to form a hard solid material. The thermoset polymer can be a highly cross-linked polymer having a three-dimensional network of polymer chains. Thermoset polymer materials undergo a chemical as well as a phase change when they are heated. However, because of their tightly cross-linked structure, thermoset polymers may be less flexible than most thermoplastic polymers. As described above, it is not desirable to use a high elastic modulus polymer material for the elastic layer 80. However, the thermoset polymer can be a blend of polymers having a low elastic modulus of less than 2 GPa, or even less than 1 GPa, or even from about 0.1 GPa to about 1 GPa. In one version, the thermoset polymer comprises a blend of polyurethane having an elastic modulus of less than 1 GPa. Suitable thermoset polymers include for example, epoxy, polyurethane, amino, phenolic, and unsaturated polyesters The polymer layer 60 can also be a thermoplastic polymer, which is melt processable (i.e, it is formed when it is in a melted or viscous phase) and which remains malleable at high temperatures. The thermoplastic polymer is selected to soften at temperatures of from about 65° C. to about 200° C. to allow molding the polymer material around the battery cell 22 without thermally degrading the battery cell. A suitable thermoplastic polymer includes for example, poly(vinylidene chloride) (PVDC).

In the version shown in FIG. 1, a polymer layer 60 is formed around and over the battery cell 22 to form a laminated battery 20. In one exemplary fabrication method, PVDC in an amount about 5 g is completely dissolved in 40 ml of methyl ethyl ketone (MEK) at a temperature of 55° C. for about 60 minutes. A thin layer of this solution is applied onto a cap 26 comprising a plate of for example, aluminum foil, aluminum foil coated with parylene or mica. The cap 26 is coated by dipping and lifting the cap 26 out of the solution, spraying the solution onto the inside surface of the cap 26 through a nozzle, or coating the solution onto the inside surface of the cap 26 by a foam brush or spin coating. The MEK in the deposited layer evaporates in about five minutes to leave an elastic PVDC layer on the surface of the cap 26. The dip coated PVDC comprises a thickness of about 10 microns, and the thickness can be adjusted by changing the concentration of the PVDC in the MEK solution, and the number of dip coating cycles. This thickness of a spray coated PVDC layer can also be adjusted by PVDC concentration, the flow rate of the carrying gas, the duration of the nozzle spray, and the number of spray coat cycles. Using similar solution, a PVDC layer can also be coated onto the cap 26 or an exterior surface 28a of the substrate 24, or by techniques, such as spray coating or brush coating. The cap 26 comprising the coated aluminum foil or mica is then transferred into a dry box and baked at 60° C. for more than four hours, to remove residual solvent and moisture. This coated aluminum foil or mica is used as the cap 26 for a battery 20 by aligning the cap 26 with the battery cell 22, and then placing this preform structure into a chamber and evacuating the chamber by removing the gas in the chamber. A pressure is applied around the preform structure, for example a pressure of less than 50 psi, or even less than 20 psi, for example, 10 psi pressure through a malleable sheet or bag. In one embodiment, the malleable sheet or bag comprises a silicon rubber sheet having a thickness of about 2 mm. The pressurized preform structure is heated to about 145° C. for less than 3 minutes, after which it is cooled down to room temperature, and the pressure is removed by venting the chamber to form a laminated battery 20. In this battery 20, the battery surface is covered with a cap 26 of either aluminum foil or mica, and a layer of polymer layer 60 comprising PVDC having a thickness of 10 microns and a sealing width of about 2.5 mm.

In yet another embodiment, a polymer layer 60 comprising Surlyn™, Dupont de Nemours Company, Delaware, which has a relative low elastic modulus of from about 0.2 to about 0.3 GPa, moderate water permeability, and good high temperature fracture resistance. The oxygen permeability of Surlyn, however, is relatively high being often in excess of 200 $cm^3 * mil/100\ inch^2/day$. In one version, the polymer layer 60 comprises a Surlyn layer having a thickness of about 50 microns, which is laminated onto a cap 26 comprising a piece of mica, as described above. The laminated cap 26 of mica and Surlyn is laminated onto a battery 20, following the procedures described above and at a lamination temperature of about 130° C.

Optionally, an edge seal 70 can be formed along all the perimeter edge of the battery 20, as shown in FIG. 1. The edge seal 70 can also be a polymer, such as the previously described thermoset and thermoplastic polymers. The sealing width, which is width of the separation gap 50 at the periphery of the battery 20, is often less than 10 mm, or even less than 5 mm, for example about 3 mm. After the laminated structure is formed, the terminal contacts 64a,b of the current collectors 48a,b, respectively 28a,b are masked off using a Teflon tape, and then the side faces 30 at the edge of the battery 20 are dip-coated into the PVDC solution to form the edge seal 70 of PVDC. After the PVDC coating, the masking tape is removed to expose the uncoated terminal contacts 64a,b. In this version, the exterior surfaces 28a,b can be also masked if needed, or just the side faces 30 of the perimeter edge of the battery 20 can be dipped into the PVDC solution.

Figure 2:
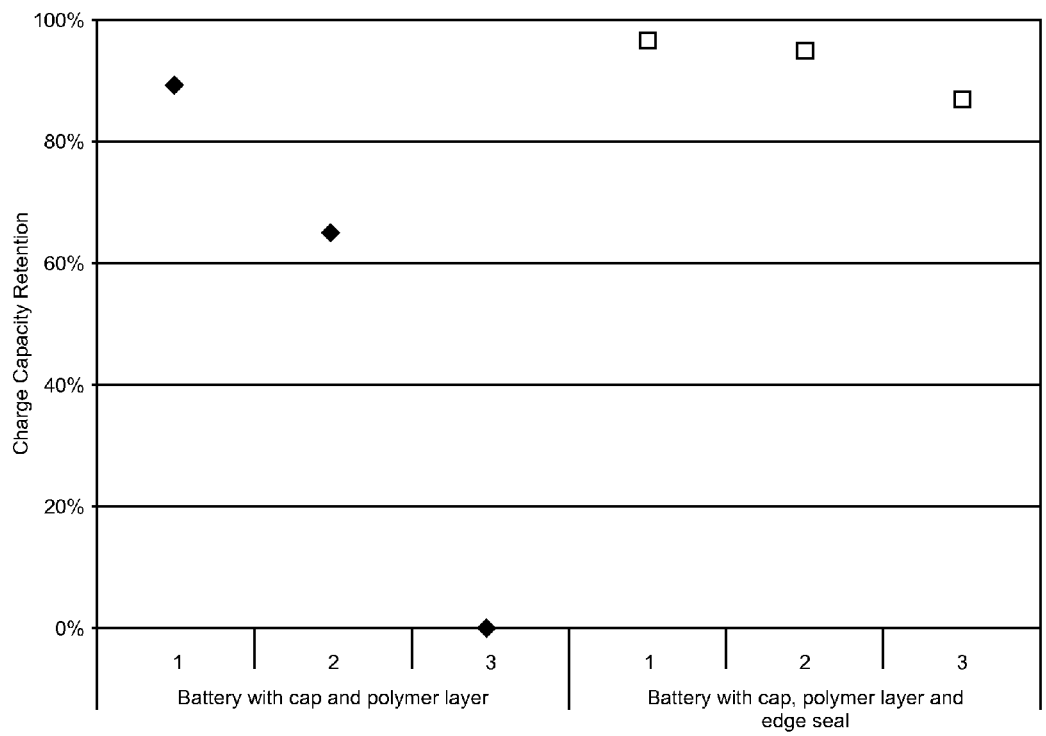
FIG. 2 is a graph showing the electrical charge capacity retention of a first battery comprising a cap covering a polymer layer and a second battery comprising a cap covering a part of the layer with an edge seal.

A battery 20 comprising a protective package 25 that includes a cap 26 coated with a polymer layer 60, and an optional edge seal 70, both provided surprisingly better protection from the environment as reflected by the high charge capacity retention of these batteries over time. FIG. 2 is a graph showing the charge capacity retention of a first battery comprising a cap 26 covering a polymer layer 60 and a second battery comprising a cap 26 covering a polymer layer 60 with an edge seal 70. The polymer layer 60 was made of Surlyn, and the edge seal 70 was made from dip coated PVDC. The batteries 20 were aged in the environment, and their charge capacity retention was tested at 60° C. and 60% relative humidity over a time period of 10 days. IN the graph, the 1, 2 and 3 values on the X-axis signify three different battery samples of each type. After aging, the battery capacity was measured at room temperature. The first group of batteries having a cap 26 and polymer layer 60 demonstrated mixed results with the battery capacity of the three samples ranging from over 80% charge capacity to close to 0% residual charge capacity, and after the 10 day test period. Further, the second group of three batteries which had a cap 26 covering a polymer layer 60 and with an edge seal 70, all demonstrated a final battery capacity of at least about 80%, or even higher than 80%, after the 10 day period. In contrast, a battery with only a impervious polymer layer but without a cap typically showed a 0% residual charge capacity in less than 10 hours.

In another version, as shown in FIG. 3, a cover layer 74 is applied over the exterior surfaces 28a, 28b, and the side faces 30 to provide enhanced sealing of these surfaces especially the side surfaces 30. The cover layer 74 can also comprise a polymer, such as the previously described thermoset and thermoplastic polymers. In this version, the same PVDC solution dip coating procedure can be used, except that the exterior surfaces 28a, 28b, and 30 are all dipped into the PVDC solution and then dried to form the cover layer 74. The cover layer 74 can also serve to reduce the total gas permeation through the side surfaces 30 into the battery 20. It is believed that the solution coating procedure also fills up mechanical imperfections in the polymer layer 60 and near the interfaces of the cover/polymer and substrate/polymer, such as for example, a partial opening or an air channel to provide better protection.

In another embodiment, as shown in FIG. 4, the polymer layer 60 comprises at least a first polymer layer 68a, and a second polymer layers 68c, and optionally, even a third polymer layer 68b, each of which were composed of thermoplastic polymers. The thermoplastic materials can be polyethylene (PE) which has low water permeability of about 0.4 $g*mm/(m^2*day)$ but a relatively higher oxygen permeability of greater than 40 $cm^3*mm/(m^2*day)$, and/or ethylene vinyl alcohol (EVOH) which has very low oxygen permeability of 0.004 $cm^3*mm/(m^2*day)$ but relatively higher water permeability of greater than 2 $g*mm/(m^2*day)$. In one version, the polymer layers 68a,c each were composed of PE, and each had a thickness of at least about 25 microns. The polymer layer 68b was composed of EVOH in a thickness of at least about 25 microns, and was sandwiched between the two polymer layers 68a, 68c. The three polymer layers 68a-c were first laminated into one single sheet, and the resultant laminated sheet was then laminated onto a cap 26 comprising an aluminum foil or a piece of mica. Using the same procedures as disclosed above, the cap 26 with the polymer layers 68a-c was then laminated to a battery cell 22 or battery 20, as shown in FIG. 4. In this version, the cap 26 can be shaped as shown, with a flat plateau 69, angular sides 71, and a base 72, to follow the contours of the battery cell 22. Advantageously, this configuration minimizes the total area of the side surfaces 30 and therefore enhances the sealing quality.

Figure 5:
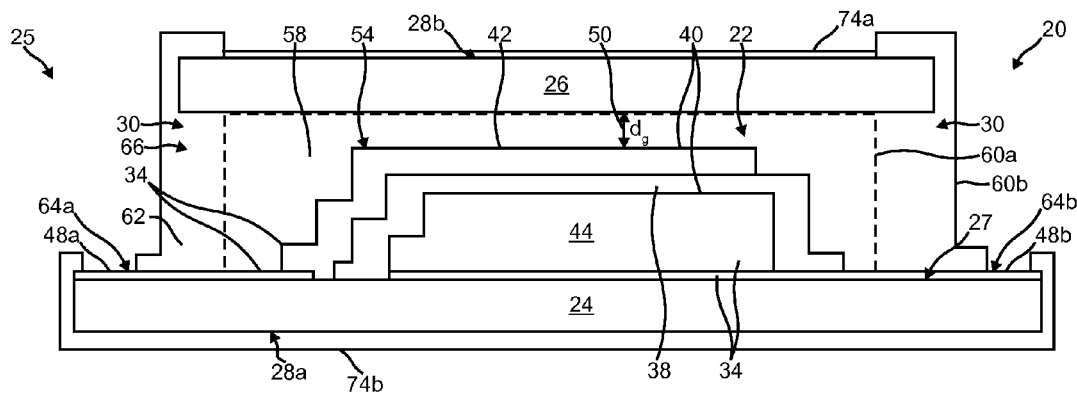
FIG. 5 is a sectional view of a battery comprising a single battery cell on a substrate with first polymer and second polymer filling the separation gap between the battery cell and a facing cap.

In another embodiment, the polymer layer 60 comprises a first polymer 60a covering a central portion 58 of the battery 20, and a second polymer 60b covering a peripheral portion 62 of the battery 20, as shown in FIG. 5. For example, the first polymer 60a is over the central portion 58 of the battery 20, and the second polymer 60b seals off the peripheral portion 62 of the battery 20 to close off the small width at this region. In one version, the first polymer 60a and second polymer 60b have different elastic modulus or different gas permeation properties. For example, the first polymer 60a can have an elastic modulus of less than 1 GPa, which can be a lower elastic modulus than the second polymer 60b, while the second polymer 60b has a lower gas permeability than the first polymer 60a, such as an oxygen, nitrogen, permeability of less than 80 $cm^3*mm/(m^2*day)$. In one version, the first polymer 60a can have a low elastic modulus of less than 0.5 GPa, while the second polymer 60b has a low gas permeability (of a gas such as an oxygen, nitrogen, carbon monoxide or carbon dioxide) of less than about 40 $cm^3*mm/(m^2*day)$. This version allows the first polymer 60 of the central portion 58 to more readily expand outward or contract when the components of the battery cell 22 alter in dimensions, while at the same time, the second polymer 60b covering the peripheral portion 62 provides better gas permeation and sealing properties. In one version, the first polymer 60a with the low elastic modulus is Surlyn™, which has an elastic modulus of about 0.3 GPa, and the second polymer 60b at the peripheral portion comprises an epoxy having a low gas permeability of less than 40 $cm^3*mm/(m^2*day)$, such as 2 $cm^3*mm/(m^2*day)$.

In the version shown in FIG. 5, the first polymer 60a covers a central portion 58 which is slightly smaller than the whole area of the cap 26 and/or the substrate 24. The second polymer 60b is applied at the peripheral portion 62 and thereafter, coated around the peripheral edge 66 of the battery 20. The separation gap 50 between the substrate 24 and the cap 26 is also filled with second polymer during the dip coating process by capillary forces working on the solution. A cover layer 74a of polymer comprising PVDC can also be applied to the exposed top surface 28b of the cap 26 and another cover layer 74b applied to the exposed bottom surface 28a of the substrate 24, or the cover layers 74a,b can be removed before the MEK solvent is evaporated to minimize the total thickness of the battery 20.

Figure 9:
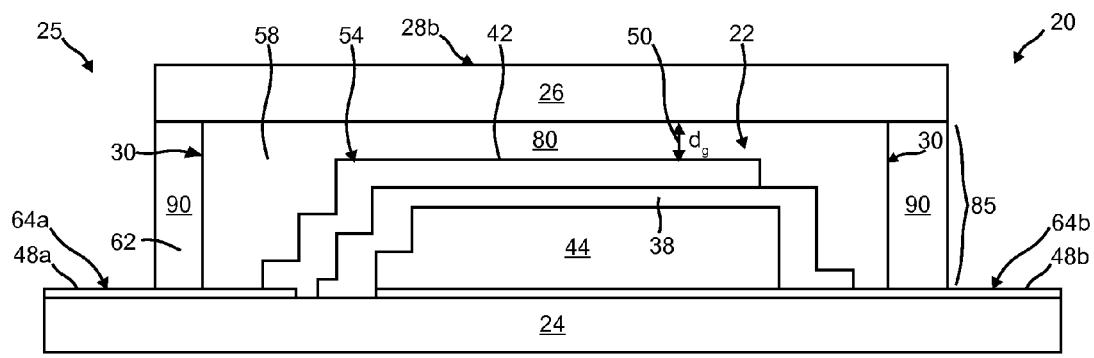
FIG. 9 is a sectional view of a battery comprising a single battery cell on a substrate with an elastic layer above a central portion of the battery and a sealing layer about a peripheral portion of the battery.

In another version, the portion of the separation gap 50 above a central portion 58 of the battery 20 which includes the portion above the non-contact surface 54 of each battery cell 22 is covered, or even filled, with an elastic layer 80 to allow expansion of the underlying battery component in this region, as shown in FIG. 9. In addition, a peripheral gap 85 about the peripheral portion 62 of the battery of the battery cell 22 is covered or enclosed with a sealing layer 90 to reduce migration of water vapor and gas species across the side faces 30 of the battery 20 to the conductors 34 and other thin films. In the version shown, the central portion 58 of the battery 20 is at least above the non-contact surface 54, which in turn is above the surface of the anode 42; however, depending on the configuration of the battery cell 22, the central portion 58 could be above other battery components. In one version, the sealing layer 90 starts from the edges of the anode or cathode current collectors 48a,b, and can even extend to the edges or slightly beyond the edges of the substrate 24 (not shown). The elastic layer 80 is selected to have a sufficiently low elastic modulus to allow the underlying battery cell 22 or battery component, such as for example, the anode 42 to expand during a charging cycle of the battery 20 and thereafter, contract during a discharge cycle of the battery 20.

In one version, the elastic layer 80 comprises an elastic modulus of less than 2 GPa, or even less than 1 GPa, or even from about 0.1 to about 0.5 GPA, to absorb the volume change during cell cycling with minimal stress generation. For example, for a battery cell 22 comprising an anode 42 comprising lithium, for every 3 microns of thickness of a cathode 44 comprising $LiCoO_2$, an extra 1 micron thickness of lithium is formed at the anode 42 when battery cell 20 is fully charged to 4.2V. The battery 20 needs to accommodate this volume change without creating stresses that damage the cell. Because many of the cell components have high elastic modulus that is higher than 4.5 GPa (for example, lithium has an elastic modulus of 4.9 GPa), an elastic layer 80 having a lower elastic modulus, for example less than 2 GPa, can absorb the volume change, especially when a number of battery cells 22 are stacked over one another. However, if the elastic modulus of the elastic layer 80 is too low, the underlying battery component such as the anode 42 can develop a rough surface after charge and discharge cycling, especially for lithium anodes, which can cause excess capacity drop. Therefore, it is also desirable for the elastic layer 80 to have an elastic modulus that is at least about 0.01 GPa. Consequently, in this lithium battery, a suitable range of elastic modulus for the elastic layer 80 is from about 0.01 GPa to about 2 GPa.

The thickness of the elastic layer 80 also affects the magnitude of the stress generated from volume change. Within the elastic limit of the elastic layer 80, the stress is approximately proportional to the amount of deformation (increase in thickness of the underlying battery component, or in an example the lithium anode) divided by the original thickness of the elastic layer 80. For example, if an elastic layer 80 having a thickness of 20 microns is compressed by 5 microns to reduce the thickness to 15 microns due to lithium formation during charging, the strain associated with the deformation is 0.25 (5/20). Assuming this is still within the elastic limit of the elastic layer 80, the stress equals the elastic modulus multiple by strain (0.25). If the thickness of the elastic layer 80 is doubled to 40 microns, the stress associated with the 5 micron deformation will be reduced in half. However, the increase in thickness of the elastic layer 80 causes a reduction of the energy density of the battery. Another disadvantage of increasing the thickness of the elastic layer 80 is that a thicker elastic layer 80 increases the cross-sectional area for the air to permeate through and therefore degrade the quality of the sealing. Therefore, for a battery with a cathode 44 having a thickness of less 10 microns, for example a cathode 44 composed of $LiCoO_2$, a suitable thickness of the elastic layer 80 is from about 10 microns to about 50 microns. An elastic layer 80 having the desired elastic modulus and thickness suppresses the roughening of lithium anode and therefore reduce the capacity fade after cycling.

In a further version, the elastic layer 80 is also sufficiently sealing to minimize the propagation of atmospheric elements, such as water vapor, nitrogen, oxygen, carbon monoxide and carbon dioxide, through the layer 80 to further improve battery life. Thus the elastic layer 80 should have a water vapor permeability of less than 4 $g*mm/(m^2*day)$, and an oxygen or nitrogen permeability of less than 80 $cm^3*mm/(m^2*day)$. However, if the battery 20 is mainly sealed by an external structure, such as a protective casing or a coating, then the permeability of elastic layer 80 can have higher values.

In one version, the elastic layer 80 is a polymer material, such as a thermoset or thermoplastic polymer. Thermoset polymers undergo a chemical change during processing to become "set" into highly cross-linked structures having a three-dimensional molecular network of polymer chains. Thermoset polymers undergo a chemical as well as a phase change when they are heated, because of their tightly cross-linked structure, and are generally less flexible than thermoplastic polymers. Typical thermoset polymers include epoxy, polyurethane, amino, phenolic, and unsaturated polyesters. However, for the elastic layer 80, it is desirable to use a material having a low elastic modulus and not a hard material having a high elastic modulus. For example, epoxy has a typical elastic modulus of about 3 GPa, thus, providing epoxy as the elastic layer 80 may cause this layer to lose its flexibility causing stresses from charging or discharge cycles to cause the battery to fail, especially for cathodes 44 having a thickness of at least about 10 microns. However, particular blends of thermoset polymers that have lower elastic modulus are suitable as an elastic layer 80, such as polyurethane, which has a typical elastic modulus of less than 1 GPa.

The elastic layer 80 is more typically a thermoplastic polymer, which are melt processable polymers, that is, they are formed when they are in a melted or viscous phase and are malleable and soften at elevated temperatures of from about 65° C. to about 200° C. or higher. Depending upon their chemistry, thermoplastics can be very much like rubber or as strong as aluminum. Some high temperature thermoplastic materials can withstand temperature extremes of up to 300° C., while others retain their properties at −70° C. Thermoplastics do not oxidize and some materials have no known solvents at room temperature. Thermoplastic materials are self-adhesive to many other materials when they are heated. Thermoplastic polymer materials have desirable properties for using as the both the elastic layer 80 and also the sealing layer 90 for the battery 20. They are typically more flexible than thermoset materials, and many have very low water, nitrogen, or oxygen permeability.

In addition to the unique physical properties, thermoplastic material can also be more easily processed than thermoset materials. In the softened condition, the thermoplastic polymer can be molded in a number of different methods, and they can be returned to their polymer state by reheating. Generally, thermoplastic polymers are heated, formed, and then cooled into their final shape.

In one example, the elastic layer 80 is fabricated by coating a layer of PVDC on the central portion of a cap 36 comprising an aluminum (Al) foil or mica plate. For example, a solution comprising 5 g of PVDC dissolved in 40 ml of methyl ethyl ketone (MEK) at 55° C. for about 60 minutes is applied onto a central portion of the cap 26. After the MEK evaporates an elastic layer 80 comprising PVDC is formed on the central portion of the cap 26 in a thickness of about 20 microns. The coated cap 26 is then baked at 60° C. for four hours to remove residual moisture. This cap 26 is aligned onto a battery cell 22 of a battery 20, and the resultant reform into a laminating chamber. The chamber is evacuated and a pressure of about 24 psi is applied to the preform through a 2 mm thick sheet of silicone rubber material. This structure is heated to about 145° C. for less than 3 minutes, after which it is cooled down to about room temperature, then the pressure is removed by venting the chamber, to provide a laminated battery having an elastic layer 60 of PVDC having a thickness of 10 microns and with a cap 26 of either aluminum foil or mica.

Alternatively, the PVDC solution can be first coated on the surface of a battery cell 22 of the battery 20 using similar procedures as described above. A solvent MEK can be used to dissolve the PVDC to provide a liquid that can be more easily applied to the battery 20. After the PVDC is coated on the central portion of the battery cell 22, a cap 26 of mica or aluminum foil is laminated onto the PVDC coated battery cell 22 using the lamination procedure described above.

In the same example, the gap 50 at the peripheral portion 62 of the battery 20 is covered with a sealing layer 90 to reduce or entirely prevent migration of water vapor and other gases from the side faces 30 to the conductors 34 and other thin films. The sealing layer 90, in conjunction with the substrate 24 and cap 26 provides an isolation boundary between the battery components and environmental elements. The sealing layer 90 should also be environmentally stable and provide a barrier against water vapor or moisture penetration, and also reduce the penetration of nitrogen, oxygen, and carbon oxides. The thickness of the sealing layer 90 is approximately the size of the gap 50 near the perimeter edge of the substrate 24 and cap 26. The width of the sealing layer 90 is the distance from the edges of the sealing layer 90 in contact with the outside environment to the edges of the sealing layer 90 near the battery component films. The width of the seal, the thickness of the seal, and the permeability of the sealing layer 90 should be selected to provide sufficient protection from permeation by the elements. The lower the permeability of the sealing layer 90, the smaller the needed width of the sealing layer 90. Also, a thinner sealing layer 90 can increase the energy density of the battery 20 while also providing sufficient impermeability to gases. A smaller sealing width increases the energy density of the battery 20 but also allows more gases to permeate through the sealing layer 90 and causes more degradation of the cell performance. In one version, the sealing layer 90 also has a moisture permeability of less than 4 g*mm/(m$^2$*day), and an oxygen and nitrogen permeability of less than 80 cm$^3$*mm/(m$^2$*day). The sealing layer 90 can also be partially pliant to allow lateral expansion of the conductor 34 by being made form a pliable material.

Suitable materials for the sealing layer 90 include epoxy, polymerized ethylene acid copolymer, poly(vinylidene chloride (PVDC), thermoset or thermoplastic polyurethane (TPU), ethylene vinyl alcohol (EVOH), Surlyn® (Dupont de Nemours, Del.), or mixtures of these materials. In one version, the sealing layer 90 includes a conductive material such as metal or ceramic powder filled epoxy and low melting point metal such as indium, tin, lead, or mixtures thereof. When such conductive materials are used as sealing materials, they should be insulated from the current collector 72.

Figure 10:
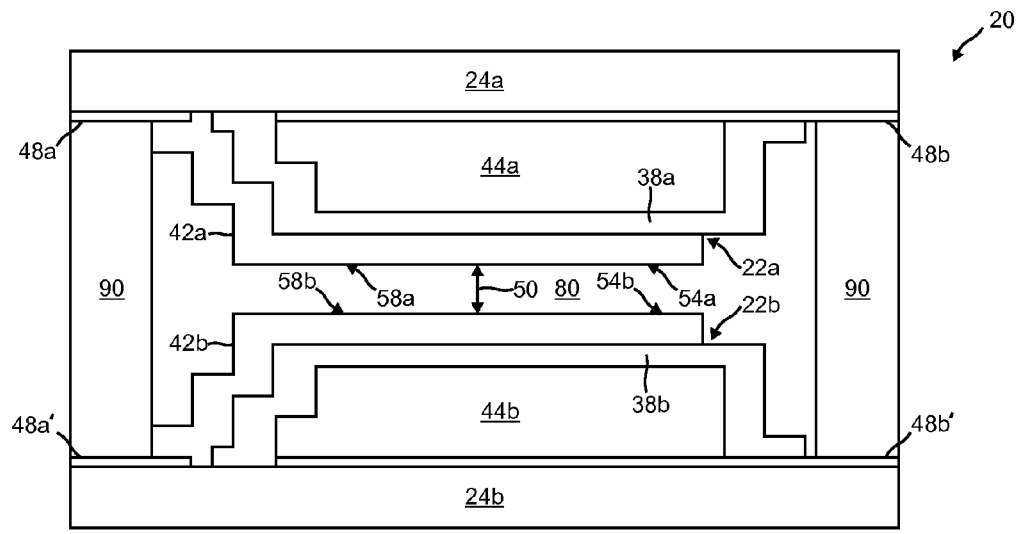
FIG. 10 is a sectional view of a battery comprising two facing battery cells with a gap therebetween which has an elastic layer and sealing layer and enclosed by caps which are the substrates themselves.

The batteries comprising the elastic layer 80 and sealing layer 90 can also be made as batteries 20 with multiple battery cells 22. For example, in the version shown in FIG. 10, the battery 20 comprises two battery cells 22$a,b$ that face one another with a separation gap 50 therebetween. In the central portions 58$a,b$ of the non-contact surfaces 54$a,b$ above the surface of the electrode 60, the separation gap 50 is filled with an elastic layer 80, while the peripheral portion is filled with a sealing layer 90. As before, the elastic layer 80 and sealing layer 90 are different materials, as described above. The first battery cell 22$a$ comprises an electrolyte 38, anode 42$a$, cathode 44$a$, and an anode current collector 48$a$ and a cathode current collector 48$b$. Both current collectors 48$a$, 48$b$ are formed on the substrate 24$a$. Similarly, battery cell 22$b$ comprises an electrolyte 38$b$, anode 42$b$ and cathode 44$b$, respectively, and also includes anode and cathode current collectors 48$a'$,b', respectively. The position and order of the anodes 42$a,b$ and anode current collectors 48$a,b$ may be interchanged with the position of the cathode 44$a,b$ and cathode current collector 48$a,b$. The separation gap 50 between the battery cells 22$a,b$ also prevents cross-talk between electrically independent conductors from the opposing battery cells 22a,b which face each other across the gap 50. In this configuration, both electrodes 42a,b expand into the gap 50 during charging of the battery cells 22a,b. The elastic layer 80 accommodates the deformation from both cells 22a,b during the charge and discharge cycles. The deformation can also be accommodated during charge and discharge cycles by allowing the battery 20 to expand into the surrounding environment. It should be noted that for a single cell battery of FIG. 9 or the double-sided battery of FIG. 7, the cap 26, elastic layer 80, and sealing layer 90 can all expand outward toward the surrounding environment to accommodate the increase in volume of the battery components during charging. For the battery structure of FIG. 10, the substrates 24a,b and the battery cells 22a,b expand to accommodate the volume increase of the anodes 42a,b and/or cathodes 44ab when the cells 22a,b are charging. The stress is usually higher when the substrate 24 and the whole battery cell 22 are deformed. Therefore, the elastic layer 80 used in the structure shown in FIG. 10 should have a lower elastic modulus and should be thicker in order to accommodate the volume change during charge and discharge without causing failure of the battery 20.

Figure 11:
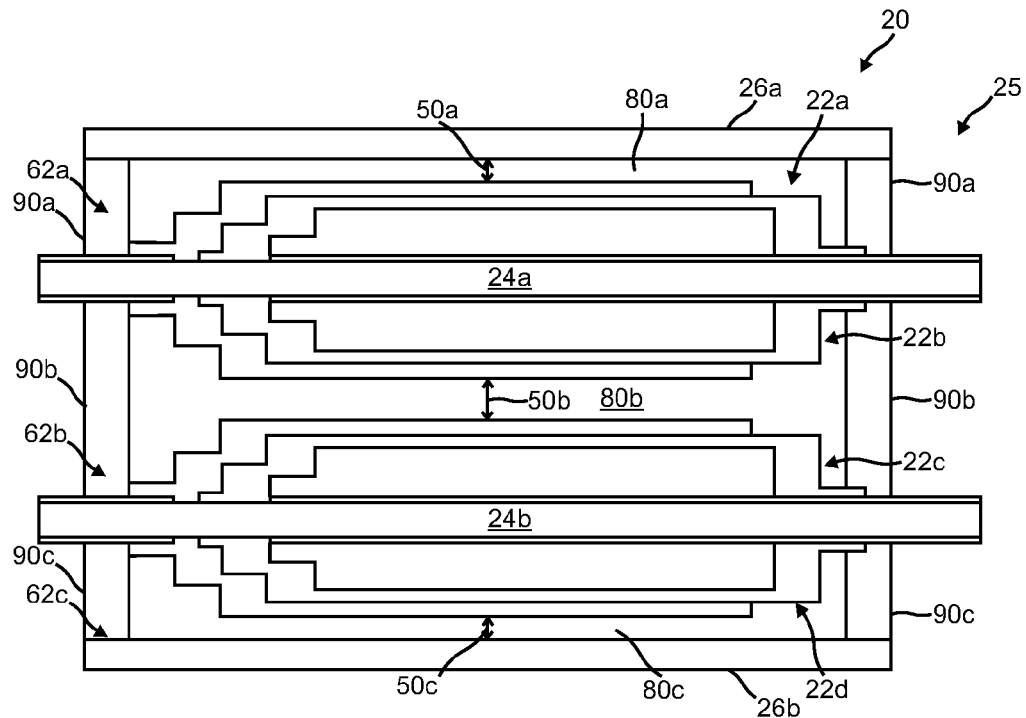
FIG. 11 is a sectional view of a battery comprising a stack of substrates that each have dual battery cells on either side, with two caps and elastic and sealing layers therebetween.

Similar protective packages 25 can be used to make a battery 20 having a stack of multiple battery cells 22 which are arranged side-by-side on a single substrate 24 or one or more of the top and bottom surfaces of each substrate 24 of a stack of substrates 24. For example, FIG. 11 shows a battery 20 comprising a vertical stack of substrates 24a,b that each have dual battery cells 22a,b, and 22c,d respectively, with two caps 26a,b, the elastic layers 80a-c, and sealing layers 90a-c, respectively, therebetween. A first gap 50a separates first cell 22a and the top cap 26a. This central portion of the first gap 50a near the first cell 22a is filled with an elastic layer 80a, and the peripheral portion 62a near the edges of the cap 26a is filled with a sealing layer 90a. A second gap 50b separates the second and third cell 22b,c and is filled with the elastic layer 80b and sealed at its peripheral portion 62b with the sealing layer 90b. A third gap 50c separates the fourth cell 22d and the bottom cap 26b, and this gap is also filled with an elastic layer 80c and sealed at the edges of the peripheral portion 62c with the sealing layer 90c. The elastic layer 80b for the center gap 50b can be more flexible or thicker because it needs to be able to accommodate the electrode expansion for two cells, 22b and 22c. Further, because the stacked battery 20 is more rigid than a battery 20 having a single substrate 24, very little deformation of the whole battery 20 can take place. Thus the maximum elastic modulus without battery failure during charge and discharge is lower for the elastic layer 80b. The elastic layers 80a,c can be made from the same material as long as the elastic modulus is low enough to accommodate the elastic layer 80b. For example, the elastic layer 80b can be Surlyn, and the elastic layers 80a,c can be PVDC.

Figure 12:
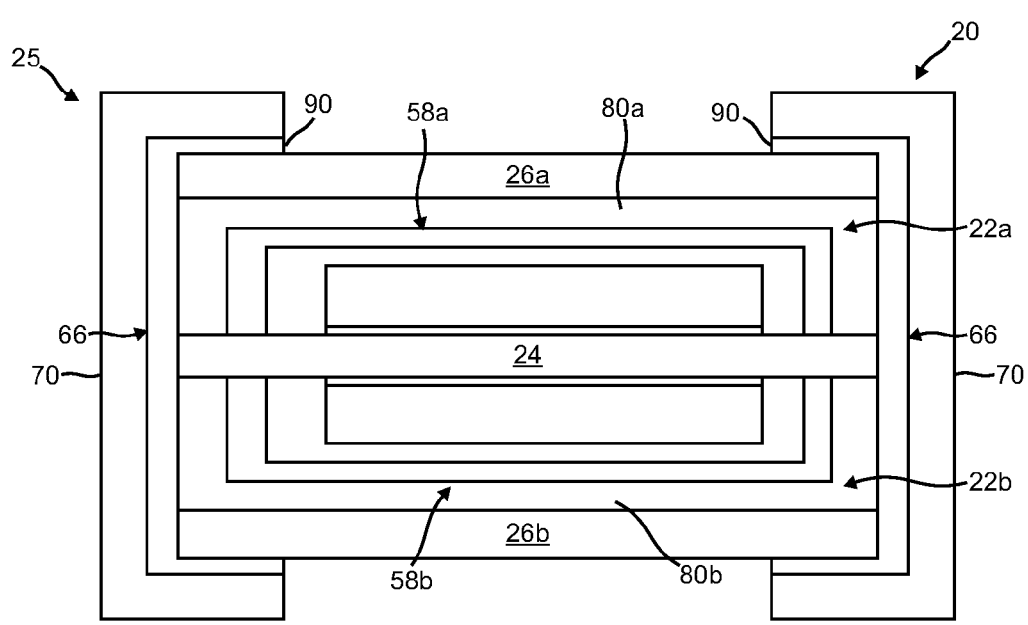
FIG. 12 is a sectional view of a battery comprising dual battery cells formed on opposing surfaces of a single substrate, and having an edge seal around its peripheral edges.

Another example, as shown in FIG. 12, comprises a protective package 25 around a battery 20 that provides a reduced footprint for the battery. In this version, the battery 20 comprises dual battery cells 22a,b formed on opposing surfaces of a single substrate 24, and having an edge seal 70 around the peripheral edge 66 of the battery 20. In one version, the edge seal 70 comprises a metal foil, such as an aluminum foil. The aluminum foil is attached to the battery 20 by a sealing layer 90 around the periphery of the battery 20 with the properties of the sealing layer 90 as disclosed above, and which can be for example, epoxy or PVDC. If all the edges of the peripheral edge 66 are sealed by this material, then the elastic layer 80 around the central portions 58a,b can have a relatively high permeability without failure of the battery 20.

The sealing structures and the sealing procedures described above can be applied to batteries 20 with other designs of multiple battery cells 22. For example, in the version shown in FIG. 6, the battery 20 comprises dual battery cells 22a,b which are formed on opposing smooth surfaces 27a,b of a single substrate 24. For example, a first battery cell 22a is formed on the first surface 27a of the substrate 24 and the second battery cell 22b is formed on the second surface 27b of the substrate 24. Each battery cell 22a,b comprises an electrolyte 38a,b between the anodes 42a,b and cathodes 44a,b. Each battery cell 22a,b has a non-contact surface 54a,b on either side of the substrate 24 that faces a cap 26a,b. The battery 20 comprises a first separation gap 50a between the non-contact surface 54a and the cap 26a, and a second separation gap 50b between the non-contact surface 54b and the cap 26b. Each separation gap 50a,b has a gap distance that is sufficiently large to provide room for expansion of battery components. In one version, the gap distances are selected to be from about 1 μm to about 120 μm, and more preferably less than 10 μm. In this battery 20, the battery cells 22a,b are connected to the external environment with the terminal contacts 64a-d. The gaps 50a,b are both filled with a polymer layer 60a,b, respectively, which can be, for example, a single polymer composed of PVDC or two different polymers 60a, b. The protective package 25 formed by the caps 26a,b and polymer layers 60a,b protects the thin films of the battery cells 22a,b from the surrounding ambient environment. Such a battery 20 can provide an energy density of more than 700 Watt hr/l and a specific energy of more than 250 Watt hr/kg which is twice as much as a conventional battery.

Figure 6:
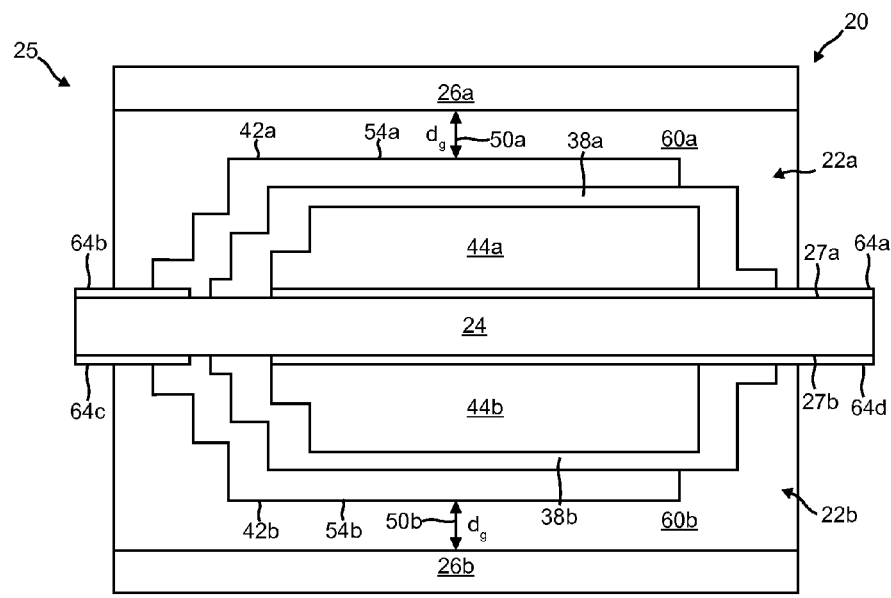
FIG. 6 is a sectional view of a battery comprising dual battery cells formed on opposing surfaces of a single substrate, and having a polymer layer filling the separation gap between each of the battery cells and their facing caps.
Figure 7:
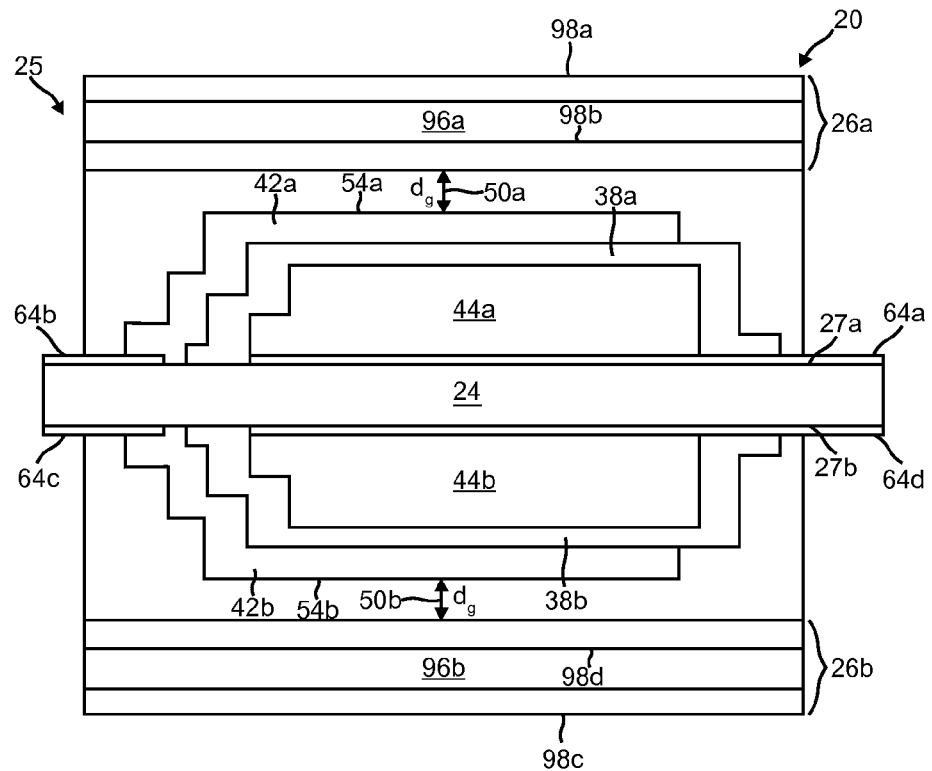
FIG. 7 is a sectional view of the battery of FIG. 6 comprising a pair of caps that are each composed of meal foil coated with polymer layers.

FIG. 7 shows the same battery as that of FIG. 6, but with a pair of caps 26a,b that are each composed of metal foil 96a,b coated with the polymer layers 98a,b and 98c,d respectively, for example, an aluminum foil sandwiched between two polymer layers. The caps 26a, b comprising the metal foils 96a,b coated with the polymer layers 98a-d are fabricated by thermo vaporization of parylene dimer at about 135° C. The dimer is then pyrolized at 680° C. to form monomer, the monomer then being polymerized on the metal foil surfaces at room temperature to form a thin coating of parylene polymer. All processes were carried out in vacuum environment. In one example, the thickness of a metal foil 96a,b comprising aluminum foil is less than 10 microns, and the thickness of the polymer layers 98a,b comprising parylene film is about 5 microns.

Figure 8:
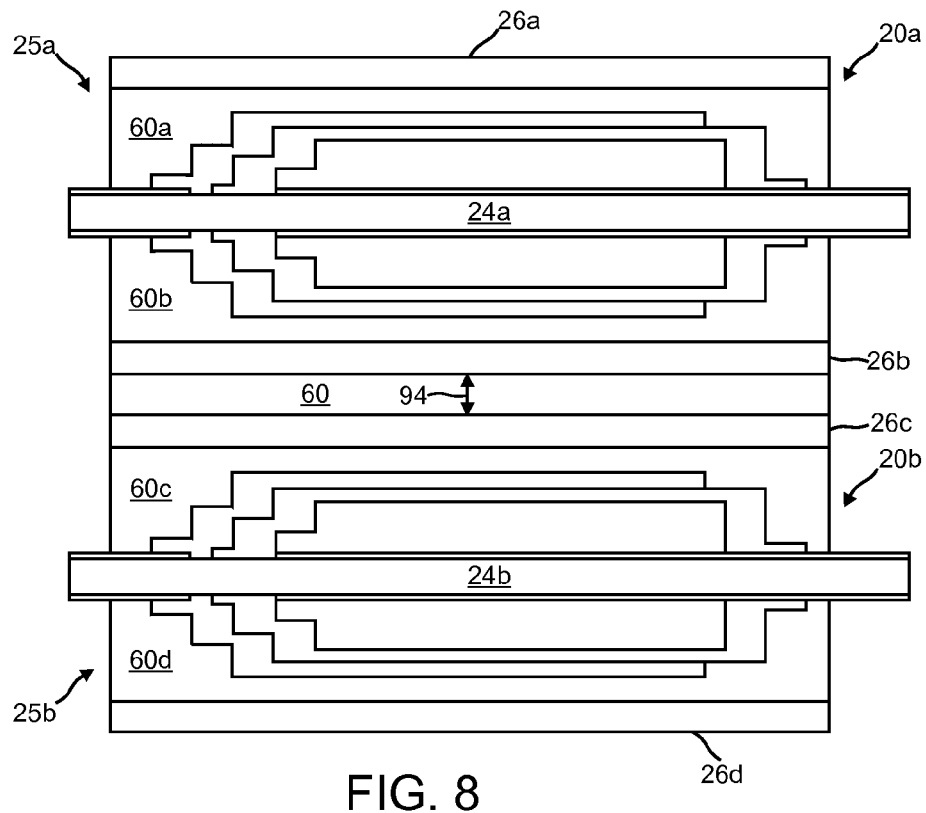
FIG. 8 is a sectional view of a pair of the batteries of FIG. 6 with an inter-battery gap formed between the two batteries.

Another embodiment of a stacked battery, as shown in FIG. 8, comprises two double-sided batteries 20a,b which are made and have a protective package 25a,b comprising four caps 26a-d and polymer layers 60a-d, as described above, and shown for the battery 20 of FIG. 6. An inter-battery gap 94 formed between the two sealed batteries 20a,b is also fully or partially filled with a polymer layer 60 comprising for example, an elastic polymer such as a thermoplastic which does not provide very good sealing function; however, the elastic polymer is very flexible, and preferably with an elastic modulus of less than 0.5 GPa. The battery in this structure has higher capacity and good flexibility.

Figure 13:
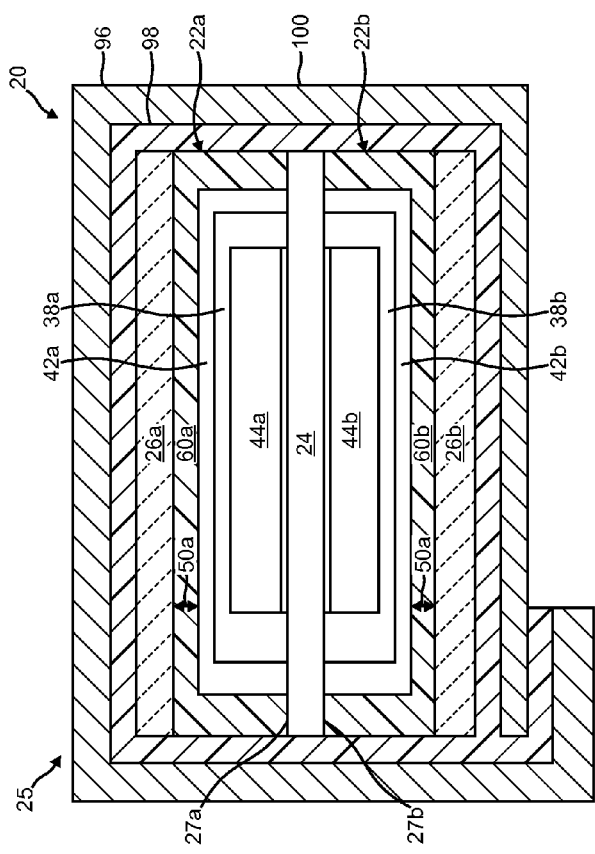
FIG. 13 is a sectional view of a battery comprising dual battery cells formed on opposing surfaces of a single substrate, and having an edge seal wrapped around the entire battery.

In still another alternative version, as shown in FIGS. 13 to 15, the battery 20 comprises battery cells 22a,b or 22a-d with a wrap around edge seal 70a. Referring to FIGS. 13 and 14, in each of these batteries 20, two battery cells 22a,b are formed on opposing smooth surfaces 27a,b of a single substrate 24. Each battery cell 22a,b comprises an electrolyte 38a,b between the anodes 42a,b and cathodes 44a,b. Each battery cell 22a,b has a cap 26a,b with a separation gap 50a,b below the caps 26*a,b* that is filled a polymer layer 60*a,b*, respectively, which can be, for example, a single polymer composed of PVDC or two different polymers 60*a,b*. Around the caps 26*a,b* is a wrap around seal 100 which is wrapped around and encloses the entire battery 20 to provide maximum sealing protection. The wrap around seal 100 can be a metal foil 96, such as an aluminum foil, or can be a metal foil 96 sandwiched between one or more polymer layers 98. For example, a wrap around seal 100 comprising a metal foils 96 coated with a polymer layers 98 can be fabricated by thermo vaporization of parylene dimer at about 135° C.; dimer is then pyrolized at 680° C. to form monomer, the monomer is then polymerized on the metal foil surfaces at room temperature to form a thin coating of parylene polymer. In one example, the thickness of a metal foil 96*a,b* comprising aluminum foil is less than 10 microns. The resultant metal foil 96 and polymer layer 98 laminate is wrapped around the battery cells 22*a,b* and laminated in place. In FIG. 14, the caps 26*a,b* are eliminated and a wrap around seal comprising a metal foil 96 such as an aluminum foil, coated with a polymer layer 98, provides the function of the caps. In this version, the gap 102 formed between two overlaying layers that each comprise a metal foil 96 and polymer layer 98, is filled with PVDC. The resultant protective package 25 formed by the polymer layers 60*a,b* and the wrap around seal 100 protects the thin films of the battery cells 22*a,b* from the surrounding ambient environment.

Protective packages 25 similar to those shown in FIGS. 13 and 14 can also be used to protect and seal a stack of batteries, as shown in FIG. 15. FIG. 15 shows a battery 20 comprising a stack of substrates 24*a,b* that each have dual battery cells 22*a,b* and 22*c,d*, respectively, on either side of each substrate 24*a,b*. The battery 20 is sealed off with two caps 26*a,b* with the polymer layers 60*a-c* between the caps 26*a,b* and the battery cells 22*a-d*. A wrap around seal 100 enclosing the caps 26*a,b* provides maximum sealing protection. The wrap around seal 100 can be a metal foil 96, such as an aluminum foil, or a metal foil 96 sandwiched between one or more polymer layers 98. For example, a wrap around seal 100 comprising a metal foil 96 coated with a polymer layers 98 can be fabricated as described before. The resultant metal foil 96 and polymer layer 98 laminate is wrapped around the battery cells 22*a,b* and laminated in place. The resultant protective package 25 formed by the caps 26*a,b*, polymer layers 60*a-c* and the wrap around seal 100 protects the thin films of the battery cells 22*a,b* from the surrounding ambient environment. In addition, the wrap around seal 100 when it has a metal foil built into the layers, serves to more rapidly dissipate heat, by acting as a heat sink, thereby preventing the temperature for rising excessively high in batteries 20 having an edge seal 70 comprising a metal foil.

The above described batteries and processes, provide better environmental protection as well as fire resistance. The present invention has been described with reference to certain exemplary or preferred versions thereof; however, other versions are possible. For example, the batteries and methods can be used in other types of applications, as would be apparent to one of ordinary skill, such as for example, other battery structures or materials, different protective packages, and other methods of making the batteries or their packages. Therefore, the spirit and scope of the appended claims should not be limited to the description of the preferred versions contained herein.

Furthermore, in this description, embodiments of the present invention were described with reference to specific embodiments; however, it will be appreciated that various modifications and changes may be made without departing from the scope of the present invention as set forth in the exemplary provisional embodiments. The specification and figures are to be regarded in an illustrative manner, rather than a restrictive one and all such modifications are intended to be included within the scope of the present invention. Accordingly, the scope of the invention should be determined by the claims and their legal equivalents. For example, the steps recited in any method or process claims may be executed in any order and are not limited to the specific order presented in the claims. Additionally, the components or elements recited in any apparatus embodiment may be assembled or otherwise operationally configured in a variety of permutations to produce substantially the same result as the present invention and are accordingly not limited to the specific configuration recited in the claims.

Still further, the benefits, other advantages and solutions to problems have been described above with regard to particular embodiments; however, any benefit, advantage, solution to problems or any element that may cause any particular benefit, advantage or solution to occur or to become more pronounced are not to be construed as critical, required or essential features or components of any or all the provisional embodiments. As used herein, the terms "comprising", "having", "including", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations or modifications of the above-described structures, arrangements, applications, proportions, elements, materials or components used in the practice of the present invention, in addition to those not specifically recited, may be varied or otherwise particularly adapted by those skilled in the art to specific environments, manufacturing specifications, design parameters or other operating requirements without departing from the general principles of the same.

What is claimed is:

1. A battery comprising:
   (a) at least one battery cell on a support, the battery cell comprising a plurality of electrodes about an electrolyte, and having a surface;
   (b) a thermoplastic material on the surface of the battery cell, the thermoplastic material comprising a nitrogen permeability or oxygen permeability that is less than 20 $cm^3 * mm/(m^2 * day)$; and
   (c) a cap covering the thermoplastic material, the cap being positioned over the battery cell to maintain a separation gap with the battery cell.

2. A battery according to claim 1 wherein the thermoplastic material comprises a water permeability of less than 4 $g * mm/(m^2 * day)$.

3. A battery according to claim 1 wherein the thermoplastic material comprises an elastic modulus of less than 1 GPa.

4. A battery according to claim 1 wherein the thermoplastic material comprises poly(vinylidene chloride), thermoplastic polyurethanes, parylene, latex or mixtures thereof.

5. A battery according to claim 1 wherein the thermoplastic material comprises a thickness of less than 50 microns.

6. A battery according to claim 1 wherein the battery cell comprises edges, and comprising an external coating covering at least a portion of the edges of the battery cell.

7. A battery according to claim 6 wherein the external coating is composed of poly(vinylidene chloride).

8. A battery according to claim 1 wherein the battery cell comprises lithium.

9. A battery according to claim 1 comprising a wrap around seal comprising metal foil.

10. A battery according to claim 1 wherein the cap extends flat across the entire width and length of the battery cell.

11. A battery according to claim 1 wherein the separation gap is at least partially filled with the thermoplastic material.

12. A battery fabrication process comprising:
(a) fabricating at least one battery cell on a support, the battery cell comprising a plurality of electrodes about an electrolyte, and having a surface;
(b) selecting a thermoplastic material comprising a nitrogen permeability or oxygen permeability that is less than 20 $cm^3$*mm/($m^2$*day); and
(c) forming a protective package around the battery cell by laminating the surface of the battery cell to the thermoplastic material and a cap, the cap being positioned over the battery cell to maintain a separation gap with the surface of the battery cell.

13. A method according to claim 12 wherein (c) comprises laminating the thermoplastic material to the cap to form a laminated thermoplastic cap, and thereafter, laminating the laminated thermoplastic cap to the battery cell.

14. A method according to claim 12 wherein the thermoplastic material comprises PVDC, polyurethane, parylene, latex or mixtures thereof.

15. A method according to claim 12 wherein (c) comprises coating the cap with a liquid layer of thermoplastic material to form a laminated thermoplastic cap, and thereafter, laminating the laminated thermoplastic cap to the battery cell.

16. A method according to claim 12 wherein (c) comprises coating the battery cell with a liquid thermoplastic material to form a thermoplastic coated battery cell, and thereafter, laminating the cap to the thermoplastic coated battery cell.

17. A method according to claim 12 comprising providing a cap that extends flat across the entire width and length of the battery cell.

18. A battery according to claim 12 comprising at least partially filling the separation gap with a thermoplastic material.

19. A method according to claim 12 wherein (a) comprises fabricating a battery cell comprising lithium.

20. A battery comprising:
(a) at least one battery cell on a support, the battery cell comprising a plurality of electrodes about an electrolyte, and having a surface;
(b) a first polymer layer on the surface of the battery cell, the first polymer comprising a thermoset polymer, and a second polymer layer on the first polymer layer, the second polymer comprising a thermoplastic polymer, the first and second polymer layers each comprising a nitrogen permeability or oxygen permeability through the thickness of the polymer layer that is less than 20 $cm^3$*mm/($m^2$*day); and
(c) a cap covering the first and second polymer layers, the cap being positioned over the battery cell to maintain a separation gap with the surface of the battery cell.

21. A battery according to claim 20 wherein the total water permeability of the first and second polymer layers is less than 4 g*mm/($m^2$*day).

22. A battery according to claim 20 wherein the first polymer layer comprises polyethylene (PE) and the second polymer layer comprises ethylene vinyl alcohol (EVOH).

23. A battery according to claim 20 wherein the first polymer comprises thermoset polyurethane and the second polymer comprises PVDC.

24. A battery according to claim 23 wherein the thermoset polyurethane comprises an elastic modulus of less than 1 GPa.

25. A battery according to claim 20 wherein the battery cell comprises lithium.

26. A battery according to claim 20 comprising a wrap around seal comprising metal foil.

27. A method according to claim 20 wherein (b) comprises selecting a thermoplastic polymer having an elastic modulus of less than 1 GPa.

28. A method according to claim 20 wherein (b) comprises selecting a thermoplastic polymer comprising poly(vinylidene chloride), polyurethane, parylene, latex, or mixtures thereof.

29. A battery fabrication process comprising:
(a) fabricating at least one battery cell on a support, the battery cell comprising a plurality of electrodes about an electrolyte, and having a surface;
(b) applying a liquid polymer layer to, the surface of the battery cell to form a polymer layer comprising:
(i) a nitrogen permeability that is less than 20 $cm^3$*mm/($m^2$*day);
(ii) an oxygen permeability that is less than 20 $cm^3$*mm/($m^2$*day); and
(iii) a water permeability of less than 4 g*mm/($m^2$*day); and
(c) laminating a cap to the polymer layer on the surface of the battery cell.

30. A process according to claim 29 wherein the polymer layer comprises PVDC, parylene, latex or polyurethane.

31. A process according to claim 29 wherein the cap comprises a metal foil.

32. A process according to claim 29 wherein (c) further comprises providing a thermoset polymer between the surface of the battery cell and the laminated cap.

33. A process according to claim 32 wherein the thermoset polymer comprises thermoset polyurethane having an elastic modulus of less than 1 GPa.

34. A process according to claim 29 wherein in (b) the polymer layer comprises a thermoset polymer.

35. A process according to claim 34 wherein the thermoset polymer comprises thermoset polyurethane having an elastic modulus of less than 1 GPa.

36. A method according to claim 29 wherein (b) comprises selecting a polymer layer comprising a thermoplastic material.

37. A method according to claim 36 comprising selecting a thermoplastic material having a nitrogen permeability or oxygen permeability that is less than 20 $cm^3$*mm/($m^2$*day).

38. A battery fabrication process comprising:
(a) fabricating at least one battery cell on a support, the battery cell comprising a plurality of electrodes about an electrolyte, and having a surface;
(b) selecting a cap;
(c) forming a polymer coated battery cell by coating a surface of the battery cell with a thermoset polymer comprising:
(i) a nitrogen permeability that is less than 20 $cm^3$*mm/($m^2$*day);
(ii) an oxygen permeability that is less than 20 $cm^3$*mm/($m^2$*day); and
(iii) a water permeability of less than 4 g*mm/($m^2$*day); and
(d) laminating the cap to the thermoset polymer coated battery cell, the cap being positioned over the battery cell to maintain a separation gap with the surface of the battery cell.

39. A process according to claim 38 wherein the cap comprises a metal foil.

40. A battery comprising:
(a) at least one battery cell on a support, the battery cell comprising a plurality of electrodes about an electrolyte, and having a surface;
(b) a thermoset material on the surface of the battery cell, the thermoset material comprising a thermoset polyurethane having:
(i) a water permeability of less than 4 g*mm/(m$^2$*day);
(ii) an elastic modulus of less than 2 GPa; and
(iii) a nitrogen permeability or oxygen permeability of less than 20 cm$^3$*mm/(m$^2$*day); and
(c) a cap covering the surface of the thermoset material, the cap being positioned over the battery cell to maintain a separation gap with the battery cell.

41. A battery according to claim 40 wherein the thermoset polyurethane comprises an elastic modulus of less than 1 GPa.

42. A battery according to claim 40 wherein the cap is composed of a metal foil, ceramic or mica.

43. A battery according to claim 40 further comprising a thermoplastic polymer about a periphery of the battery cell.

44. A battery according to claim 40 wherein the battery cell comprises lithium.

45. A battery according to claim 40 comprising a wrap around seal comprising metal foil.

46. A battery comprising:
(a) a substrate comprising a first surface comprising a first battery cell having a surface with a central portion and a peripheral portion;
(b) a first polymer covering the central portion of the surface;
(c) a second polymer covering the peripheral portion of the surface, the second polymer being a different polymer than the first polymer; and
(d) a cap covering the exposed surface of the first and second polymers.

47. A battery according to claim 46 wherein the first polymer comprises an elastic modulus of less than 1 GPa.

48. A battery according to claim 47 wherein the second polymer comprises at least one of:
(i) a water permeability of less than 4 g*mm/(m$^2$*day);
(ii) a nitrogen permeability of less than 20 cm$^3$*mm/(m$^2$*day); and
(iii) an oxygen permeability of less than 20 cm$^3$*mm/(m$^2$*day).

49. A battery according to claim 46 wherein the first polymer comprises surlyn or polyurethane and the second polymer comprises epoxy or PVDC.

50. A battery according to claim 46 wherein the first polymer comprises thermoset polyurethane.

51. A battery according to claim 46 wherein the second polymer comprises PVDC.

52. A battery according to claim 46 comprising a wrap around seal comprising metalfoil.

53. A battery fabrication process comprising:
(a) fabricating at least one battery cell on a support, the battery cell comprising a plurality of electrodes about an electrolyte;
(b) selecting a thermoplastic material comprising a nitrogen permeability or oxygen permeability that is less than 20 cm$^3$*mm/(m$^2$*day); and
(c) laminating the thermoplastic material to a cap to form a laminated thermoplastic cap, and thereafter, laminating the laminated thermoplastic cap to the battery cell.

54. A process according to claim 53 wherein (b) comprises selecting a thermoplastic material having at least one of the following properties:
(i) a water permeability of less than 4 g*mm/(m$^2$*day);
(ii) an elastic modulus of less than 1 GPa;
(iii) a thickness of less than 50 microns and
(iv) the thermoplastic material comprises poly(vinylidene chloride), thermoplastic polyurethanes, latex, or mixtures thereof.

55. A process according to claim 53 wherein in (c), the cap comprises metal, ceramic or polymer.

56. A process according to claim 53 wherein (a) comprises fabricating a battery cell comprising lithium.

57. A battery fabrication process comprising:
(a) fabricating at least one battery cell on a support, the battery cell comprising a plurality of electrodes about an electrolyte;
(b) selecting a thermoplastic material comprising a nitrogen permeability or oxygen permeability that is less than 20 cm$^3$*mm/(m$^2$*day); and
(c) coating a cap with a liquid layer of thermoplastic material to form a laminated thermoplastic cap, and thereafter, laminating the laminated thermoplastic cap to the battery cell.

58. A process according to claim 57 wherein (b) comprises selecting a thermoplastic material having at least one of the following properties:
(i) a water permeability of less than 4 g*mm/(m$^2$*day);
(ii) an elastic modulus of less than 1 GPa;
(iii) a thickness of less than 50 microns; and
(iv) the thermoplastic material comprises poly(vinylidene chloride), thermoplastic polyurethanes, latex, or mixtures thereof.

59. A process according to claim 57 wherein in (c), the cap comprises metal, ceramic or polymer.

60. A process according to claim 57 wherein (a) comprises fabricating a battery cell comprising lithium.

61. A battery comprising:
(a) a substrate comprising a first surface comprising a battery cell having a central portion and a peripheral portion;
(b) a first polymer composed of thermoset polyurethane covering the central portion, the first polymer having an elastic modulus of less than 1 GPa; and
(c) a second polymer composed of PVDC covering the peripheral portion, the second polymer having an oxygen permeability of less than 20 cm$^3$*mm/(m$^2$*day).

62. A battery according to claim 61 comprising a wrap around seal comprising metal foil.

63. A battery according to claim 61 comprising a cap composed of a metal, ceramic or mica.

64. A battery according to claim 61 wherein the battery cell comprises lithium.

65. A battery comprising:
(a) at least one battery cell on a support, the battery cell comprising a plurality of electrodes about an electrolyte, and having a surface;
(b) a thermoplastic material on the surface of the battery cell, the thermoplastic material comprising:
(i) a nitrogen permeability that is less than 20 cm$^3$*mm/(m$^2$*day);
(ii) an oxygen permeability that is less than 20 cm$^3$*mm/(m$^2$*day); and
(iii) a water permeability of less than 4 g*mm/(m$^2$*day); and (c) a cap covering the thermoplastic material, the cap being positioned over the battery cell to maintain a separation gap with the surface of the battery cell.

66. A battery according to claim 65 wherein the thermoplastic material comprises an elastic modulus of less than 1 GPa.

67. A battery according to claim 65 wherein the thermoplastic material comprises poly(vinylidene chloride), polyurethane, parylene, latex, or mixtures thereof.

68. A battery according to claim 65 wherein the battery cell comprises lithium.

69. A battery fabrication process comprising:
(a) fabricating at least one battery cell on a support, the battery cell comprising a plurality of electrodes about an electrolyte, and having a surface;
(b) selecting a polymer;
(c) selecting a cap; and
(d) forming a protective package around the battery cell by coating the cap with a liquid layer of the polymer to form a polymer coated cap, and laminating the polymer coated cap to the surface of the battery cell.

70. A method according to claim 69 wherein (b) comprises selecting a polymer comprising a thermoplastic material.

71. A method according to claim 70 comprising selecting a thermoplastic material having a nitrogen permeability or oxygen permeability that is less than 20 $cm^3*mm/(m^2*day)$.

72. A method according to claim 70 wherein the thermoplastic material comprises PVDC, polyurethane, parylene, latex, or mixtures thereof.

* * * * *